(12) United States Patent
Ben Dayan et al.

(10) Patent No.: US 12,292,797 B2
(45) Date of Patent: *May 6, 2025

(54) DISTRIBUTED ERASURE CODED VIRTUAL FILE SYSTEM

(71) Applicant: Weka.IO LTD, Tel Aviv (IL)

(72) Inventors: Maor Ben Dayan, Tel Aviv (IL); Omri Palmon, Tel Aviv (IL); Liran Zvibel, Tel Aviv (IL)

(73) Assignee: Weka.IO Ltd. (IL)

( * ) Notice: Subject to any disclaimer, the term of this patent is extended or adjusted under 35 U.S.C. 154(b) by 38 days.

This patent is subject to a terminal disclaimer.

(21) Appl. No.: 18/330,711

(22) Filed: Jun. 7, 2023

(65) Prior Publication Data

US 2023/0333930 A1 Oct. 19, 2023

Related U.S. Application Data

(63) Continuation of application No. 17/591,217, filed on Feb. 2, 2022, now Pat. No. 11,740,971, which is a (Continued)

(51) Int. Cl.
*G06F 11/10* (2006.01)
*G06F 3/06* (2006.01)
(Continued)

(52) U.S. Cl.
CPC ........ *G06F 11/1088* (2013.01); *G06F 3/0619* (2013.01); *G06F 3/064* (2013.01);
(Continued)

(58) Field of Classification Search
CPC ............ G06F 11/1088; G06F 11/1076; G06F 11/1415; G06F 3/0619; G06F 3/064; G06F 3/0664; G06F 3/067

See application file for complete search history.

(56) References Cited

U.S. PATENT DOCUMENTS 6,487,636 B1 11/2002 Dolphin et al.
7,447,839 B2 4/2008 Uppala
(Continued)

FOREIGN PATENT DOCUMENTS

CN 1283905 A 2/2001
CN 1361886 A 7/2002
(Continued)

OTHER PUBLICATIONS

Int'l Search Report and Written Opinion AppIn No. PCT/IB2016/001177 dated Dec. 2, 2016 (11 pgs).
(Continued)

*Primary Examiner* — Nadeem Iqbal
(74) *Attorney, Agent, or Firm* — McAndrews Held & Malloy, Ltd.

(57) ABSTRACT

A plurality of computing devices are communicatively coupled to each other via a network, and each of the plurality of computing devices comprises one or more of a plurality of storage devices. A plurality of failure resilient address spaces are distributed across the plurality of storage devices such that each of the plurality of failure resilient address spaces spans a plurality of the storage devices. Each one of the plurality of failure resilient address spaces is organized into a plurality of stripes. Each one or more stripes of the plurality of stripes is part of a respective one of a plurality of forward error correction (FEC) protection domains. Each of the plurality of stripes may comprise a plurality of storage blocks. Each block of a particular one of the plurality of stripes may reside on a different one of the plurality of storage devices.

14 Claims, 17 Drawing Sheets

Related U.S. Application Data continuation of application No. 16/546,684, filed on Aug. 21, 2019, now Pat. No. 11,269,727, which is a continuation of application No. 15/667,097, filed on Aug. 2, 2017, now Pat. No. 10,437,675, which is a continuation of application No. 15/243,519, filed on Aug. 22, 2016, now Pat. No. 9,747,162, which is a continuation of application No. 14/833,053, filed on Aug. 22, 2015, now Pat. No. 9,448,887.

(51) Int. Cl.
*G06F 11/14* (2006.01)
*G06F 16/182* (2019.01)
*G06F 16/188* (2019.01)

(52) U.S. Cl.
CPC ............ *G06F 3/0664* (2013.01); *G06F 3/067* (2013.01); *G06F 11/1076* (2013.01); *G06F 11/1415* (2013.01); *G06F 16/182* (2019.01); *G06F 16/188* (2019.01); *G06F 2201/80* (2013.01)

(56) References Cited

U.S. PATENT DOCUMENTS

| | | |
|---|---|---|
| 7,681,072 B1 | 3/2010 | Gibson et al. |
| 7,793,146 B1 | 9/2010 | Gibson et al. |
| 8,099,623 B1 | 1/2012 | Li et al. |
| 8,627,331 B1 | 1/2014 | Grunwald |
| 8,645,749 B2 | 2/2014 | Reche |
| 8,918,475 B2 | 12/2014 | Ozzie et al. |
| 9,087,012 B1 | 7/2015 | Hayes et al. |
| 9,448,887 B1 | 9/2016 | Ben Dayan et al. |
| 9,633,073 B1 * | 4/2017 | Allen .................. G06F 16/2462 |
| 9,747,162 B2 | 8/2017 | Ben Dayan et al. |
| 10,437,675 B2 | 10/2019 | Ben Dayan et al. |
| 11,269,727 B2 | 3/2022 | Ben Dayan et al. |
| 2011/0154100 A1 | 6/2011 | Lee et al. |
| 2013/0246842 A1 | 9/2013 | Ohno |
| 2014/0195847 A1 * | 7/2014 | Webman ................. G06F 3/067 |
| | | 714/6.22 |
| 2015/0127975 A1 | 5/2015 | Patterson |
| 2015/0355971 A1 | 12/2015 | Becker-Szendy et al. |
| 2016/0246677 A1 | 8/2016 | Sangamkar et al. |

FOREIGN PATENT DOCUMENTS

| | | |
|---|---|---|
| CN | 1959648 A | 5/2007 |
| CN | 101176263 A | 5/2008 |
| CN | 101247202 A | 8/2008 |

OTHER PUBLICATIONS

Int'l Preliminary Report on Patentability Appln No. PCT/IB2016/001177 dated Mar. 8, 2018 (6 pgs.).
Int'l Search Report and Written Opinion Appln No. PCT/IB2016/001177 dated Dec. 2, 2016 (11 pgs).
Int'l Preliminary Report on Patentability Appln No. PCT/IB2016/001177 dated Mar. 8, 2018 (6 pgs.).
Partial European search report, Appln No. EP 16838618.3 dated Feb. 21, 2019 (17 pgs).
Extended European Search Report, Appln No. EP 16838618.3 dated May 31, 2019 (14 pgs).
Extended European Search Report, Appln No. EP 22213815.8 dated Jun. 12, 2023 (7 pgs).

* cited by examiner

DISTRIBUTED ERASURE CODED VIRTUAL FILE SYSTEM

PRIORITY CLAIM

This application is a continuation of U.S. application Ser. No. 17/591,217, Feb. 2, 2022, which is a continuation of U.S. patent application Ser. No. 16/546,684, filed Aug. 21, 2019, now U.S. Pat. No. 11,269,727, which is a continuation of U.S. patent application Ser. No. 15/667,097, filed Aug. 2, 2017, now U.S. Pat. No. 10,437,675, which is a continuation of U.S. patent application Ser. No. 15/243,519, filed Aug. 22, 2016, now U.S. Pat. No. 9,747,162, which is a continuation of U.S. patent application Ser. No. 14/833,053, filed Aug. 22, 2015, now U.S. Pat. No. 9,448,887, which incorporates by reference U.S. patent application Ser. No. 14/789,422, filed Jul. 1, 2015. The above identified applications are all hereby incorporated herein by reference in their entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

BRIEF SUMMARY

Methods and systems are provided for distributed, erasure-coded virtual file system substantially as illustrated by and/or described in connection with at least one of the figures, as set forth more completely in the claims.

DETAILED DESCRIPTION

Figure 1:
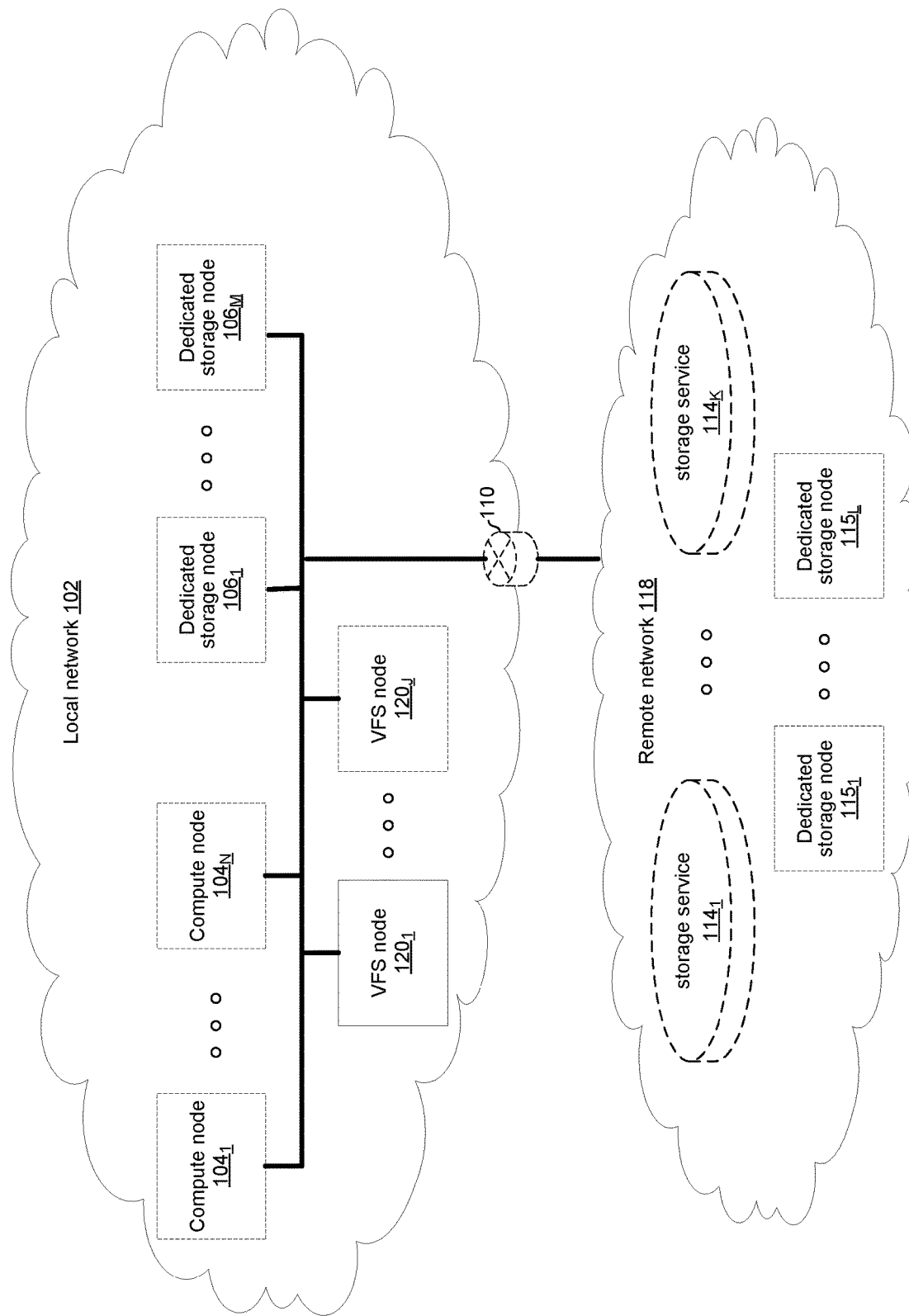
FIG. 1 illustrates various example configurations of a virtual file system in accordance with aspects of this disclosure.

FIG. 1 illustrates various example configurations of a virtual file system in accordance with aspects of this disclosure. Shown in FIG. 1 is a local area network (LAN) 102 comprising one or more virtual file system (VFS) nodes 120 (indexed by integers from 1 to J, for $j \geq 1$), and optionally comprising (indicated by dashed lines): one or more dedicated storage nodes 106 (indexed by integers from 1 to M, for $M \geq 1$), one or more compute nodes 104 (indexed by integers from 1 to N, for $N \geq 1$), and/or an edge router that connects the LAN 102 to a remote network 118. The remote network 118 optionally comprises one or more storage services 114 (indexed by integers from 1 to K, for $K \geq 1$), and/or one or more dedicated storage nodes 115 (indexed by integers from 1 to L, for $L \geq 1$).

Each compute node $104_n$ (n an integer, where $1 \leq n \leq N$) is a networked computing device (e.g., a server, personal computer, or the like) that comprises circuitry for running a variety of client processes (either directly on an operating system of the device $104_n$ and/or in one or more virtual machines/containers running in the device $104_n$) and for interfacing with one or more VFS nodes 120. As used in this disclosure, a "client process" is a process that reads data from storage and/or writes data to storage in the course of performing its primary function, but whose primary function is not storage-related (i.e., the process is only concerned that its data is reliable stored and retrievable when needed, and not concerned with where, when, or how the data is stored). Example applications which give rise to such processes include: an email server application, a web server application, office productivity applications, customer relationship management (CRM) applications, and enterprise resource planning (ERP) applications, just to name a few. Example configurations of a compute node $104_n$ are described below with reference to FIG. 2.

Each VFS node $120_j$ (j an integer, where $1 \leq j \leq J$) is a networked computing device (e.g., a server, personal computer, or the like) that comprises circuitry for running VFS processes and, optionally, client processes (either directly on an operating system of the device $104_n$ and/or in one or more virtual machines running in the device $104_n$). As used in this disclosure, a "VFS process" is a process that implements one or more of: the VFS driver, the VFS front end, the VFS back end, and the VFS memory controller described below in this disclosure. Example configurations of a VFS node $120_j$ are described below with reference to FIG. 3. Thus, in an example implementation, resources (e.g., processing and memory resources) of the VFS node $120_j$ may be shared among client processes and VFS processes. The processes of the virtual file system may be configured to demand relatively small amounts of the resources to minimize the impact on the performance of the client applications. From the perspective of the client process(es), the interface with the virtual file system is independent of the particular physical machine(s) on which the VFS process(es) are running.

Each on-premises dedicated storage node $106_m$ (m an integer, where $1 \leq m \leq M$) is a networked computing device and comprises one or more storage devices and associated circuitry for making the storage device(s) accessible via the LAN 102. An example configuration of a dedicated storage node $106_m$ is described below with reference to FIG. 4.

Each storage service $114_k$ (k an integer, where $1 \leq k \leq K$) may be a cloud-based service such as Amazon S3, Microsoft Azure, Google Cloud, Rackspace, Amazon Glacier, and Google Nearline.

Each remote dedicated storage node $115_l$ (l an integer, where $1 \leq l \leq L$) may be similar to, or the same as, an on-premises dedicated storage node 106. In an example implementation, a remote dedicated storage node $115_1$ may store data in a different format and/or be accessed using different protocols than an on-premises dedicated storage node 106 (e.g., HTTP as opposed to Ethernet-based or RDMA-based protocols).

Figure 2:
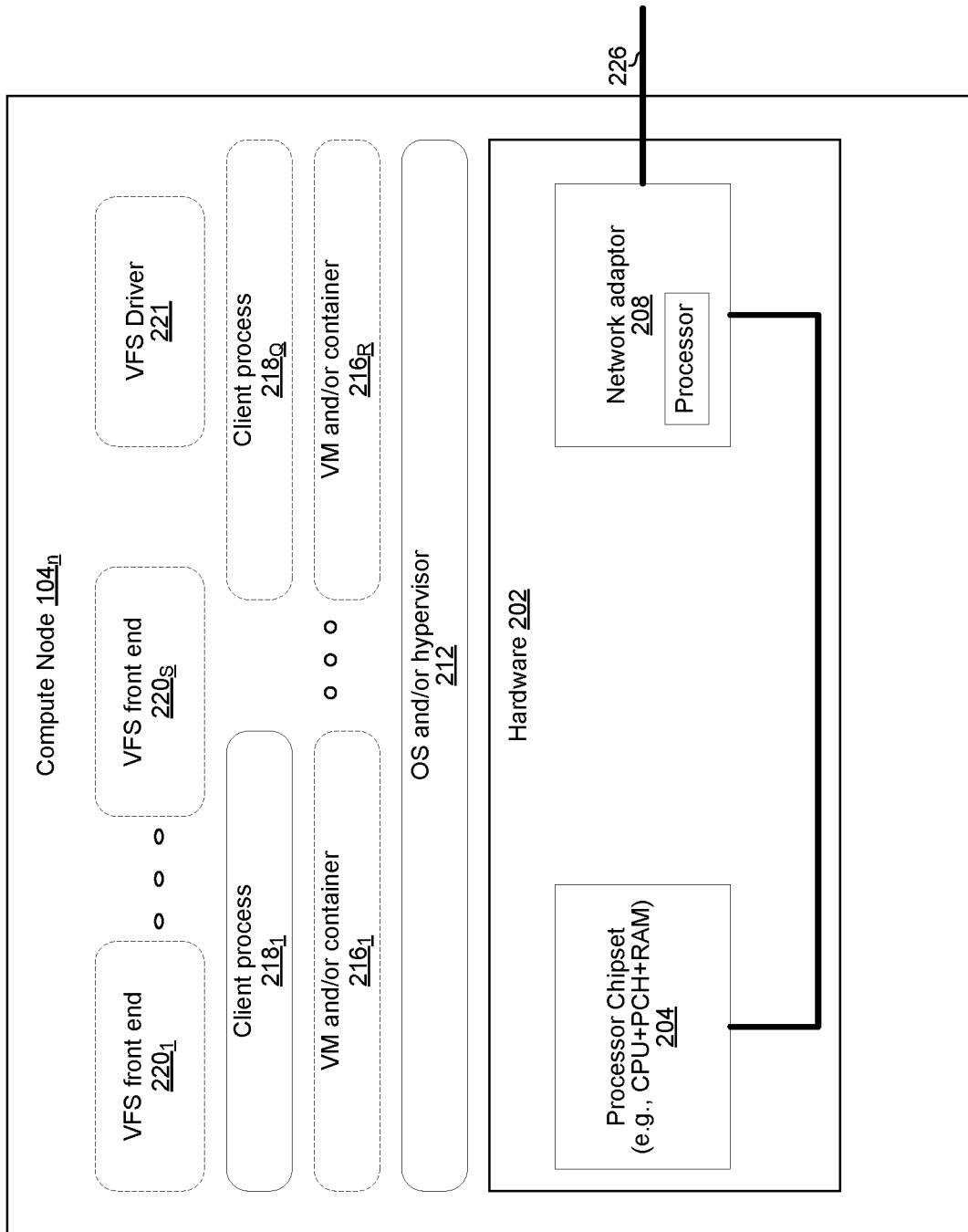
FIG. 2 illustrates various example configurations of a compute node that uses a virtual file system in accordance with aspects of this disclosure.

FIG. 2 illustrates various example configurations of a compute node that uses a virtual file system in accordance with aspects of this disclosure. The example compute node $104_n$ comprises hardware 202 that, in turn, comprises a processor chipset 204 and a network adaptor 208.

The processor chipset 204 may comprise, for example, an x86-based chipset comprising a single or multi-core processor system on chip, one or more RAM ICs, and a platform controller hub IC. The chipset 204 may comprise one or more bus adaptors of various types for connecting to other components of hardware 202 (e.g., PCIe, USB, SATA, and/or the like).

The network adaptor 208 may, for example, comprise circuitry for interfacing to an Ethernet-based and/or RDMA-based network. In an example implementation, the network adaptor 208 may comprise a processor (e.g., an ARM-based processor) and one or more of the illustrated software components may run on that processor. The network adaptor 208 interfaces with other members of the LAN 100 via (wired, wireless, or optical) link 226. In an example implementation, the network adaptor 208 may be integrated with the chipset 204.

Software running on the hardware 202 includes at least: an operating system and/or hypervisor 212, one or more client processes 218 (indexed by integers from 1 to Q, for $Q \geq 1$) and a VFS driver 221 and/or one or more instances of VFS front end 220. Additional software that may optionally run on the compute node $104_n$ includes: one or more virtual machines (VMs) and/or containers 216 (indexed by integers from 1 to R, for $R \geq 1$).

Each client process $218_q$ (q an integer, where $1 \leq q \leq Q$) may run directly on an operating system 212 or may run in a virtual machine and/or container $216_r$ (r an integer, where $1 \leq r \leq R$) serviced by the OS and/or hypervisor 212. Each client processes 218 is a process that reads data from storage and/or writes data to storage in the course of performing its primary function, but whose primary function is not storage-related (i.e., the process is only concerned that its data is reliably stored and is retrievable when needed, and not concerned with where, when, or how the data is stored).

Example applications which give rise to such processes include: an email server application, a web server application, office productivity applications, customer relationship management (CRM) applications, and enterprise resource planning (ERP) applications, just to name a few.

Each VFS front end instance $220_s$ (s an integer, where $1 \leq s \leq S$ if at least one front end instance is present on compute node $104_n$) provides an interface for routing file system requests to an appropriate VFS back end instance (running on a VFS node), where the file system requests may originate from one or more of the client processes 218, one or more of the VMs and/or containers 216, and/or the OS and/or hypervisor 212. Each VFS front end instance $220_s$ may run on the processor of chipset 204 or on the processor of the network adaptor 208. For a multi-core processor of chipset 204, different instances of the VFS front end 220 may run on different cores.

Figure 3:
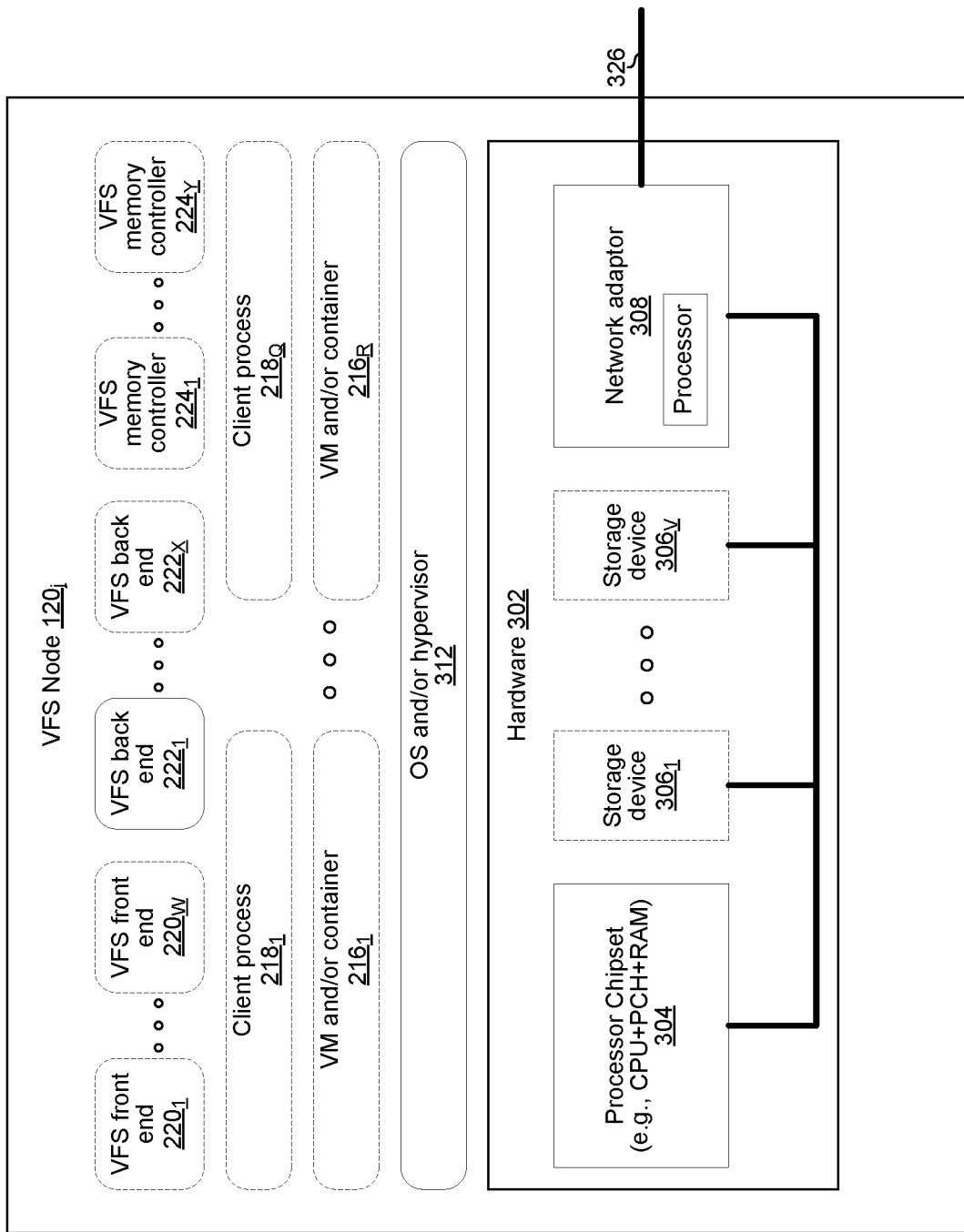
FIG. 3 illustrates various example configurations of a dedicated virtual file system node in accordance with aspects of this disclosure.

FIG. 3 shows various example configurations of a dedicated virtual file system node in accordance with aspects of this disclosure. The example VFS node $120_j$ comprises hardware 302 that, in turn, comprises a processor chipset 304, a network adaptor 308, and, optionally, one or more storage devices 306 (indexed by integers from 1 to W, for $W \geq 1$).

Each storage device $306_p$ (p an integer, where $1 \leq p \leq P$ if at least one storage device is present) may comprise any suitable storage device for realizing a tier of storage that it is desired to realize within the VFS node $120_j$.

The processor chipset 304 may be similar to the chipset 204 described above with reference to FIG. 2. The network adaptor 308 may be similar to the network adaptor 208 described above with reference to FIG. 2 and may interface with other nodes of LAN 100 via link 326.

Software running on the hardware 302 includes at least: an operating system and/or hypervisor 212, and at least one of: one or more instances of VFS front end 220 (indexed by integers from 1 to W, for $W \geq 1$), one or more instances of VFS back end 222 (indexed by integers from 1 to X, for $X \geq 1$), and one or more instances of VFS memory controller 224 (indexed by integers from 1 to Y, for $Y \geq 1$). Additional software that may optionally run on the hardware 302 includes: one or more virtual machines (VMs) and/or containers 216 (indexed by integers from 1 to R, for $R \geq 1$), and/or one or more client processes 318 (indexed by integers from 1 to Q, for $Q \geq 1$). Thus, as mentioned above, VFS processes and client processes may share resources on a VFS node and/or may reside on separate nodes.

The client processes 218 and VM(s) and/or container(s) 216 may be as described above with reference to FIG. 2.

Each VFS front end instance $220_w$ (w an integer, where $1 \leq w \leq W$ if at least one front end instance is present on VFS node $120_j$) provides an interface for routing file system requests to an appropriate VFS back end instance (running on the same or a different VFS node), where the file system requests may originate from one or more of the client processes 218, one or more of the VMs and/or containers 216, and/or the OS and/or hypervisor 212. Each VFS front end instance $220_s$ may run on the processor of chipset 304 or on the processor of the network adaptor 308. For a multi-core processor of chipset 304, different instances of the VFS front end 220 may run on different cores.

Each VFS back end instance $222_x$ (x an integer, where $1 \leq x \leq X$ if at least one back end instance is present on VFS node $120_j$) services the file system requests that it receives and carries out tasks to otherwise manage the virtual file system (e.g., load balancing, journaling, maintaining metadata, caching, moving of data between tiers, removing stale data, correcting corrupted data, etc.) Each VFS back end instance $222_x$ may run on the processor of chipset 304 or on the processor of the network adaptor 308. For a multi-core processor of chipset 304, different instances of the VFS back end 222 may run on different cores.

Each VFS memory controller instance $224_u$ (u an integer, where 1≤u≤U if at least VFS memory controller instance is present on VFS node $120_j$) handles interactions with a respective storage device 306 (which may reside in the VFS node $120_j$ or another VFS node 120 or a storage node 106). This may include, for example, translating addresses, and generating the commands that are issued to the storage device (e.g. on a SATA, PCIe, or other suitable bus). Thus, the VFS memory controller instance $224_u$ operates as an intermediary between a storage device and the various VFS back end instances of the virtual file system.

Figure 4:
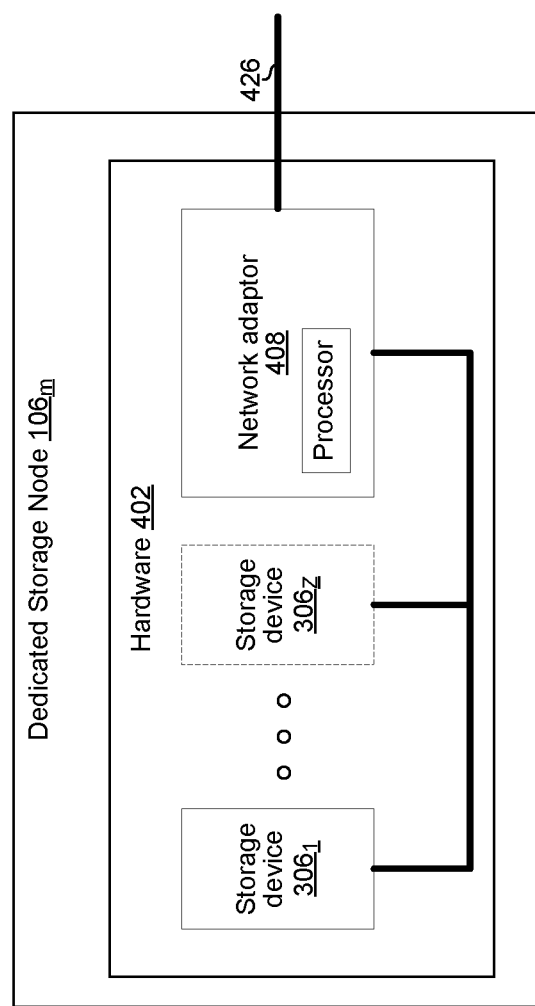
FIG. 4 illustrates various example configurations of a dedicated storage node in accordance with aspects of this disclosure.

FIG. 4 illustrates various example configurations of a dedicated storage node in accordance with aspects of this disclosure. The example dedicated storage node $106_m$ comprises hardware 402 which, in turn, comprises a network adaptor 408 and at least one storage device 306 (indexed by integers from 1 to Z, for Z≥1). Each storage device $306_z$ may be the same as storage device 306, described above with reference to FIG. 3. The network adaptor 408 may comprise circuitry (e.g., an arm based processor) and a bus (e.g., SATA, PCIe, or other) adaptor operable to access (read, write, etc.) storage device(s) $406_1$-$406_z$ in response to commands received over network link 426. The commands may adhere to a standard protocol. For example, the dedicated storage node $106_m$ may support RDMA based protocols (e.g., Infiniband, RoCE, iWARP etc.) and/or protocols which ride on RDMA (e.g., NVMe over fabrics).

In an example implementation, tier 1 memory is distributed across one or more storage devices 306 (e.g., FLASH devices) residing in one or more storage node(s) 106 and/or one or more VFS node(s) 120. Data written to the VFS is initially stored to Tier 1 memory and then migrated to one or more other tier(s) as dictated by data migration policies, which may be user-defined and/or adaptive based on machine learning.

Figure 5A:
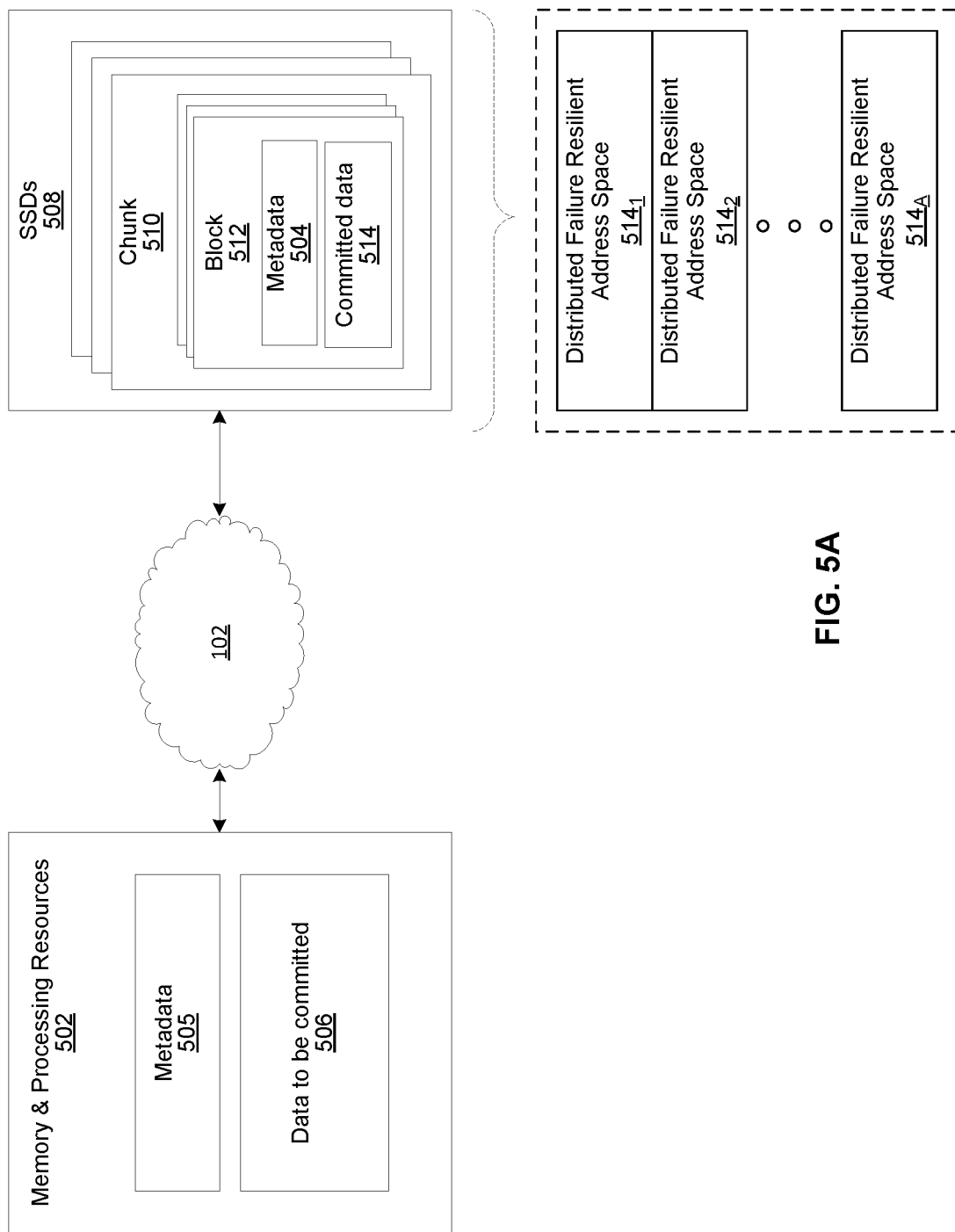
FIG. 5A illustrates another representation of a virtual file system in accordance with an example implementation of this disclosure.

FIG. 5A illustrates another representation of a virtual file system in accordance with an example implementation of this disclosure. In FIG. 5A, the element 502 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described above. The element 508 represents the one or more physical storage devices 306 which provide the long term storage of the virtual file system.

As shown in FIG. 5A, the physical storage is organized into a plurality of distributed failure resilient address spaces (DFRASs) 514. In each of which comprises a plurality of chunks 510, which in turn comprises a plurality of blocks 512. The organization of blocks 512 into chunks 510 is only a convenience in some implementations and may not be done in all implementations. Each block 512 stores committed data 514 (which may take on various states, discussed below) and/or metadata 504 that describes committed data 514.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns. Each DFRAS being owned/accessible by only its owner node allows each of the nodes of the virtual file system to control a portion of the storage 308 without having to coordinate with any other nodes (except during [re]assignment of DFRASs during initialization or after a node failure, for example, which may be performed asynchronously to actual reads/commits to storage 308). Thus, in such an implementation, each node may read/commit to its DFRASs independently of what the other nodes are doing, with no requirement to reach any consensus when reading and committing to storage 308. To permit such operation, metadata may be maintained that maps each DFRAS to its current owning node such that reads and commits to storage 308 can be redirected to the appropriate node. Furthermore, in the event of a failure of a particular node, the fact the particular node owns a plurality of DFRASs permits more intelligent/efficient its workload to other nodes (rather the whole workload having to be assigned to a single node, which may create a "hot spot"). In this regard, in some implementations the number of DFRASs may be large relative to the number of nodes in the system such that any one DFRAS may be a relatively small load to place on another node. This permits fine grained redistribution of the load of a failed node according to the capabilities/capacity of the other nodes (e.g., nodes with more capabilities/capacity may be given a higher percentage of the failed nodes DFRASs).

Figure 5B:
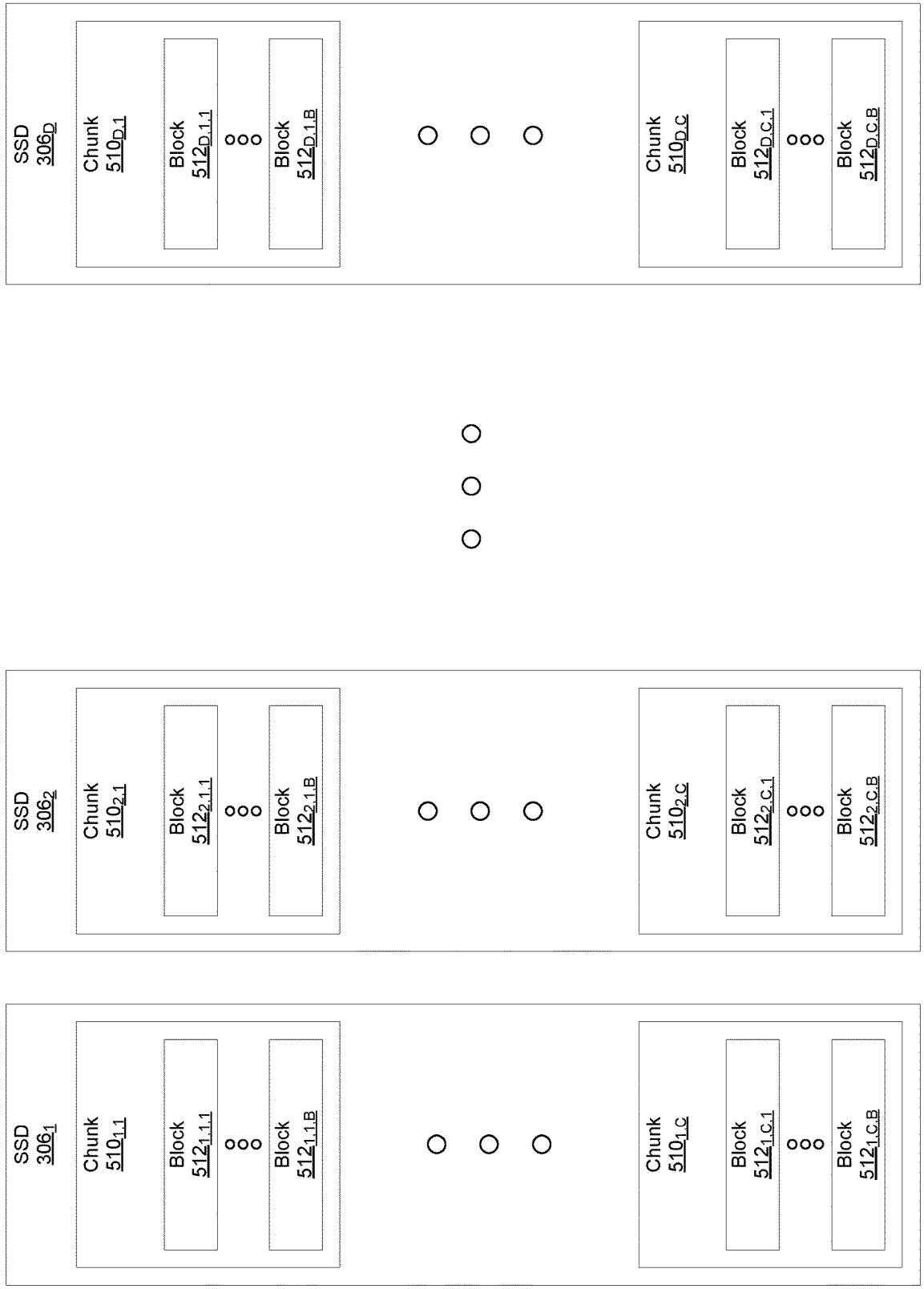
FIG. 5B illustrates an example implementation of the storage of FIG. 5A.

Referring briefly to FIG. 5B, shown is an example implementation in which a virtual file system comprises D (an integer) SSDs $508_1$-$508_D$, each SSD $508_d$ (d being an integer, where 1≤d≤D) comprises C (an integer) chunks $510_{d,1}$-$510_{d,C}$, and each chunk $510_{d,c}$ (c being an integer, where 1≤c≤C) comprises B (an integer) blocks $512_{d,c,1}$-$512_{d,c,B}$. As discussed further below, the chunks $510_{1,1}$-$510_{D,C}$ may be further organized into a plurality of chunk stripes $520_1$-$520_S$ (S being an integer). In an example implementation, each chunk stripe $520_s$ (s being an integer, where 1≤s≤S) is separately protected using forward error correction (e.g., erasure coding). The number of chunks $510_{d,c}$ in any particular chunk stripe $520_s$ may thus be determined based on the desired level of data protection.

Assuming, for purposes of illustration, that each chunk stripe $520_s$ comprises N=M+K (where each of N, M, and K are integers) chunks $510_{d,c}$, then M of the N chunks $510_{d,c}$ may store data digits (typically binary digits or "bits" for current storage devices) and K of the N chunks $510_{d,c}$ may store protection digits (again, typically bits). To each stripe $520_s$, then, the virtual file system may assign N chunks $508_{d,c}$ from N different failure domains.

As used herein, a "failure domain" refers to a group of components in which a failure of any single one of the components (the component losing power, becoming non-responsive, and/or the like) may result in failure of all the components. For example, if a rack has a single top-of-the-rack switch a failure of that switch will bring down connectivity to all the components (e.g., compute, storage, and/or VFS nodes) on that rack. Thus, to the rest of the system it is equivalent to if all of the components on that rack failed together. A virtual file system in accordance with this disclosure may comprise fewer failure domains than chunks 510.

In an example implementation where the nodes of the virtual file system are connected and powered in a fully-redundant way with only a single storage device 306 per such node, a failure domain may be just that single storage device 306. Thus, in an example implementation, each chunk stripe 520$_s$ comprises a plurality of chunks 510$_a$, residing on each of N of the storage devices 306$_1$-306$_D$, (D is thus greater than or equal to N). An example of such an implementation is shown in FIG. 5C.

Figure 5C:
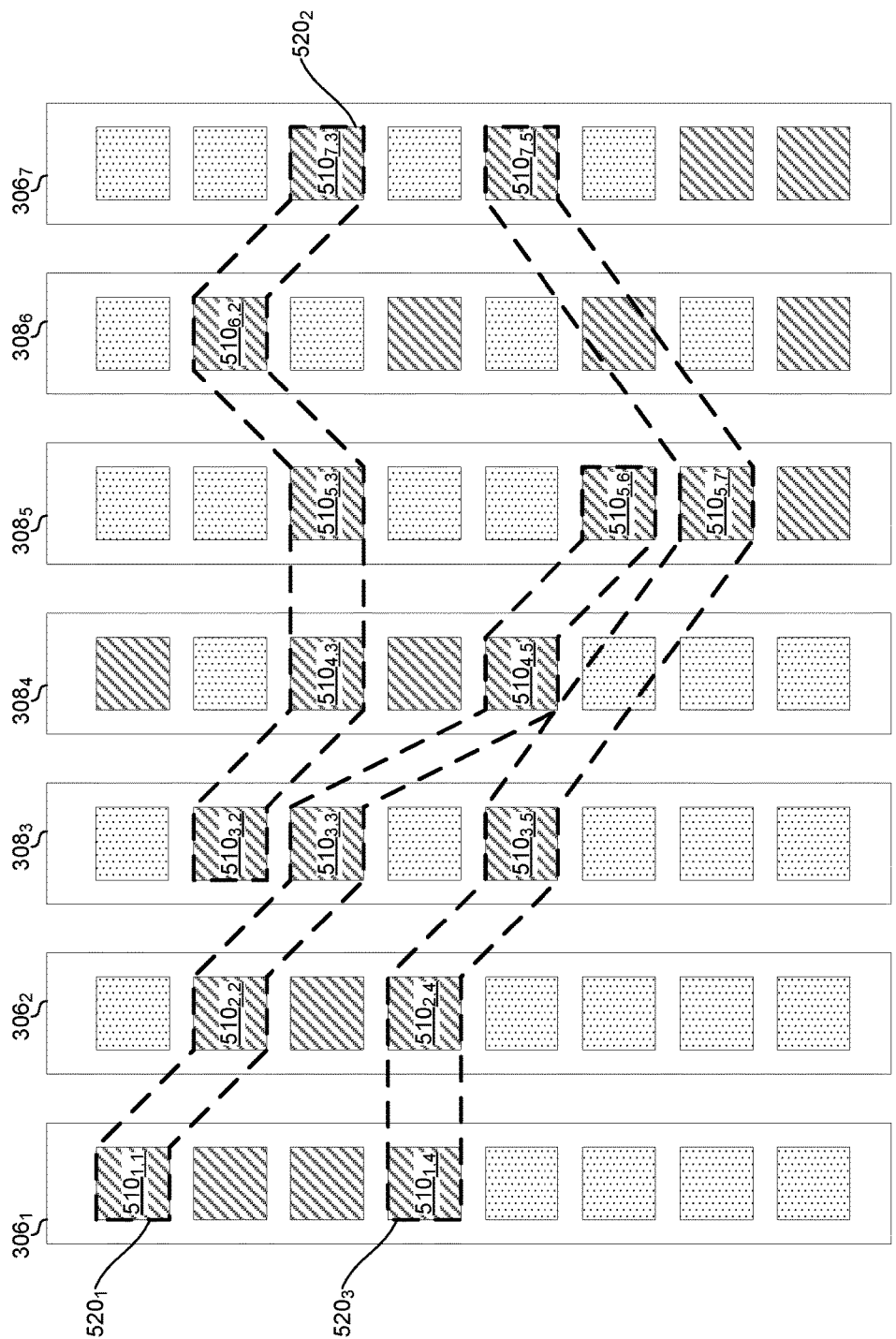
FIG. 5C illustrates an example implementation in which two distributed failure resilient address spaces reside on a plurality of solid-state storage disks.

In FIG. 5C, D=7, N=5, M=4, K=1, and the storage is organized into two DFRASs. These numbers are merely for illustration and not intended as limiting. Three chunk stripes 520 of the first DFRAS are arbitrarily called out for illustration. The first chunk stripe 520$_1$ consists of chunks 510$_{1,1}$, 510$_{2,2}$, 510$_{3,3}$, 510$_{4,5}$ and 510$_{5,6}$; the second chunk stripe 520$_2$ consists of chunks 510$_{3,2}$, 510$_{4,3}$, 510$_{5,3}$, 510$_{6,2}$ and 510$_{7,3}$; and the third chunk stripe 520$_3$ consists of chunks 510$_{1,4}$, 510$_{2,4}$, 510$_{3,5}$, 510$_{5,7}$ and 510$_{7,5}$.

Although D=7 and N=5 in the simple example of FIG. 5C, in an actual implementation D may be much larger than N (e.g., by a multiple of an integer greater than 1 and possibly as high as many orders of magnitude) and the two values may be chosen such that the probability of any two chunk stripes 520 of a single DFRAS residing on the same set of N storage devices 306 (or, more generally, on the same set of N failure domains) is below a desired threshold. In this manner, failure of any single storage device 306$_d$ (or, more generally, any single failure domain) will result (with the desired statistical probably determined based on: chosen values of D and N, the sizes of the N storage devices 306, and the arrangement of failure domains) in loss of at most one chunk 510$_{b,c}$ of any particular stripe 520$_s$. Even further, a dual failure will result in vast majority of stripes losing at most a single chunk 510$_{b,c}$ and only small number of stripes (determined based on the values of D and N) will lose two chunks out of any particular stripe 520$_S$ (e.g., the number of two-failure stripes may be exponentially less than the number of one-failure stripes).

For example, if each storage device 306$_d$ is 1 TB, and each chunk is 128 MB, then failure of storage device 306$_d$ will result (with the desired statistical probably determined based on: chosen values of D and N, the sizes of the N storage devices 306, and the arrangement of failure domains) in 7812 (=1 TB/128 MB) chunk stripes 520 losing one chunk 510. For each such affected chunk stripe 520$_s$, the lost chunk 510$_{d,c}$ can be quickly reconstructed using an appropriate forward error correction algorithm and the other N−1 chunks of the chunk stripe 520$_s$. Furthermore, since the affected 7812 chunk stripes are uniformly distributed across all of the storage devices 306$_1$-306$_D$, reconstructing the lost 7812 blocks 510$_{d,c}$ will involve (with the desired statistical probably determined based on: chosen values of D and N, the sizes of the N storage devices 306, and the arrangement of failure domains) reading the same amount of data from each of storage devices 306$_1$-306$_D$ (i.e., the burden of reconstructing the lost data is uniformly distributed across all of storage devices 306$_1$-306$_D$ so as to provide for very quick recovery from the failure).

Next, turning to the case of a concurrent failure of two of the storage devices 306$_1$-306$_D$ (or, more generally, concurrent failure of two failure domains), due to the uniform distribution of the chunk stripes 520$_1$-520$_S$ of each DFRAS over all of the storage devices 306$_1$-306$_D$, only a very small number of chunk stripes 520$_1$-520$_S$ will have lost two of their N chunks. The virtual file system may be operable to quickly identify such two-loss chunk stripes based on metadata which indicates a mapping between chunk stripes 520$_1$-520$_S$ and the storage devices 306$_1$-306$_D$. Once such two-loss chunk stripes are identified, the virtual file system may prioritize reconstructing those two-loss chunk stripes before beginning reconstruction of the one-loss chunk stripes. The remaining chunk stripes will have only a single lost chunk and for them (the vast majority of the affected chunk stripes) a concurrent failure of two storage devices 306$_d$ is the same as a failure of only one storage device 306$_d$. Similar principles apply for a third concurrent failure (the number of chunk stripes having three failed blocks will be even less than the number having two failed blocks in the two concurrent failure scenario), and so on. In an example implementation, the rate at which reconstruction of a chunk stripe 520$_s$ is performed may be controlled based on the number of losses in the chunk stripe 520$_s$. This may be achieved by, for example, controlling the rates at which reads and commits for reconstruction are performed, the rates at which FEC computations for reconstruction are performed, the rates at which network messages for reconstruction are communicated, etc.

Figure 5D:
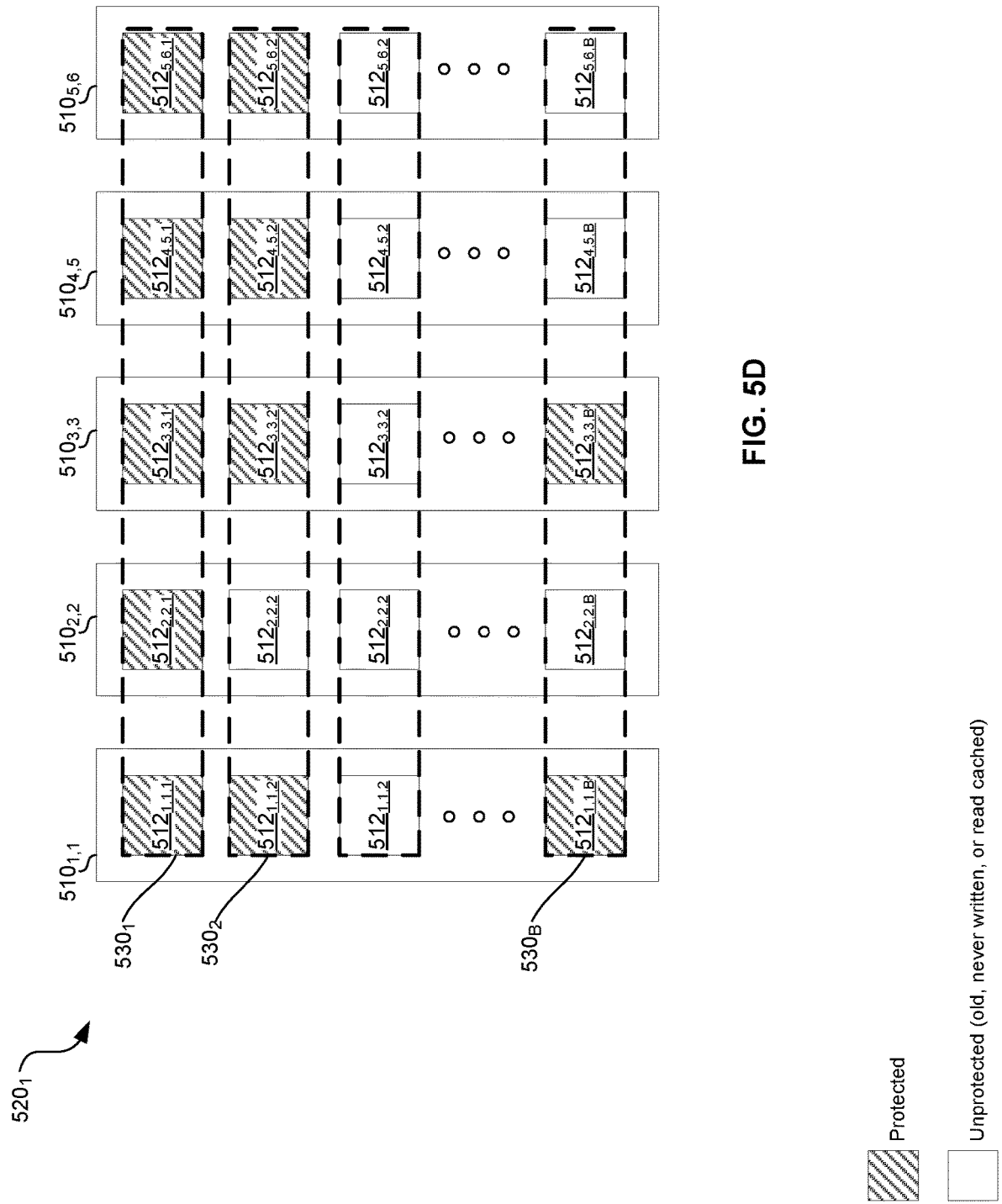
FIG. 5D illustrates an example chunk stripe in accordance with an example implementation of this disclosure.

Now referring to FIG. 5D, an example implementation of the chunk stripe 520$_1$ of FIG. 5C is shown. The blocks 512$_{d,c,b}$ of the chunks 510$_{d,c}$ are organized into block stripes 530$_1$-530$_B$, where each block stripe 530$_b$ comprises the blocks 512$_{d,c,b}$ at a particular offset within the chunks 510$_{1,1}$, 510$_{2,2}$, 510$_{3,3}$, 510$_{4,5}$ and 510$_{5,6}$ (e.g., block stripe 530$_b$ consists of the block at offset b×L in each of the chunks 510$_{1,1}$, 510$_{2,2}$, 510$_{3,3}$, 510$_{4,5}$ and 510$_{5,6}$, where L is the size of the blocks (e.g., 4 kB)). In an example implementation where B=1, a chunk stripe degrades to a block stripe and the terms can be used synonymously. Each block 512$_{d,c,b}$ may store data digits, protection digits, and/or metadata. In an example implementation, such metadata includes one or more bitmaps which indicates, for each block stripe 530$_b$, which blocks 512$_{d,c,b}$ of the block stripe 530$_b$ are currently protected and which blocks 512$_{d,c,b}$ of the block stripe 530$_b$ are not currently protected. Blocks which are not protected may include: blocks to which data has never been written; blocks storing data which an owner has indicated is no longer needed (e.g., the owner has deleted the file that the data corresponds to or superseding data has been committed elsewhere in the virtual file system); and blocks (referred to herein as "read cached" blocks) for which a redundant, protected copy exists elsewhere in the virtual file system (e.g., on object storage).

Returning to FIG. 5A, in operation, data 506 to be committed to the storage 508 is generated by, and/or stored ("staged") in, the processing and memory resources of 502 until it is committed to storage 508. When the virtual file system is ready to commit ("de-stage") the data 506, the data 506 is communicated to the storage 508 via the LAN 102. Which particular block(s) 512 of which particular chunk(s) 510 of which particular chunk stripe(s) 520 the data is committed to may be determined based on metadata 504 and/or metadata 505 that describes the current state of the virtual file system (including, for example, which blocks of storage 508 are currently used, unused, protected, and/or unprotected).

Figure 6A:
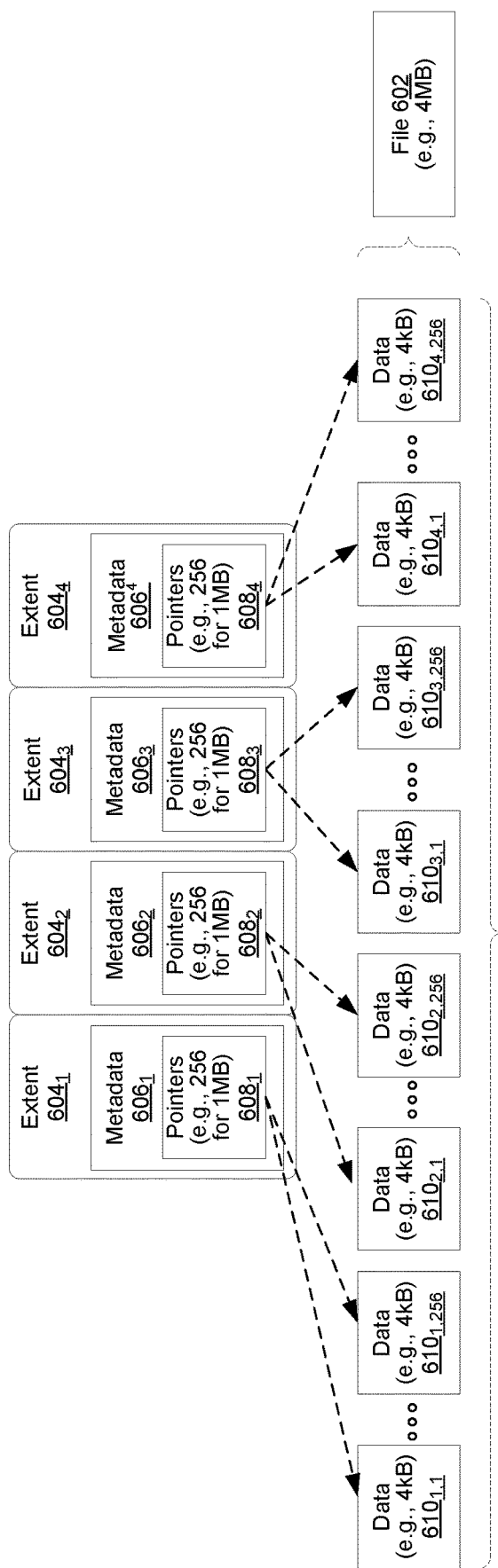
FIG. 6A illustrates storage of an example file to a virtual file system in accordance with an example implementation of this disclosure.

FIG. 6A illustrates storage of an example file to a virtual file system in accordance with an example implementation of this disclosure. In FIG. 6A, a 4 MB file 602 is to be committed to a particular DFRAS. The file 602 is split into 1024 portions 610, each portion 610 being 4 kB in size. Each 4 kB portion 610 is then written to a respective block 512 of the DFRAS using a protection scheme such as one or more of those described below with respect to FIGS. 9-11. Each 1 MB of the file is associated with a respective one of extents 604$_1$-604$_4$. The sizes of the file, 602 extents 604, portions 610, and block 512 were all chosen arbitrarily for illustration and are not intended as limiting. Each extent 604$_e$ (e an integer between 1 and 4 in FIG. 6A) comprises metadata $606_e$ (which may be part of, or used for generating, the metadata 504 and/or 505 in FIG. 5A). Metadata $606_e$ comprises information for locating the file portions 610 on the storage 508. This may include, for example, a pointer to each block 512 storing one of the portions 610 associated with the extent $604_e$. The 1024 blocks 512 to which the 1024 portions are assigned may (with determined probability) be uniformly distributed across the failure domains of the DFRAS. Keeping a pointer to each block to which a portion of the file 602 has been committed enables committing any particular portion of the file 602 to any particular block of the DFRAS, regardless of which storage device and/or stripe the particular block resides on. This effectively decouples the logical-address/offset of a portion of data and the block on storage 308 to which it may be committed. This enables coalescing data from different client application write operations to a single commit to a most-attractive-stripe. So even in the case of many writes of 4 kB or less from possibly many unrelated client applications, the virtual file system can still coalesce the data and commit it to a single stripe, by just updating the respective extents to point to that stripe. Thus, many "stranger-to-each-other" writes can share the same commit overhead (e.g., increase the average value of 'U' described below with reference to FIGS. 12A and 12B). As a result, the particular stripes and/or storage devices to which one or more portions of a particular file are committed may change over time as portions of the file are deleted and/or overwritten. An example is illustrated in FIG. 6B.

Figure 6B:
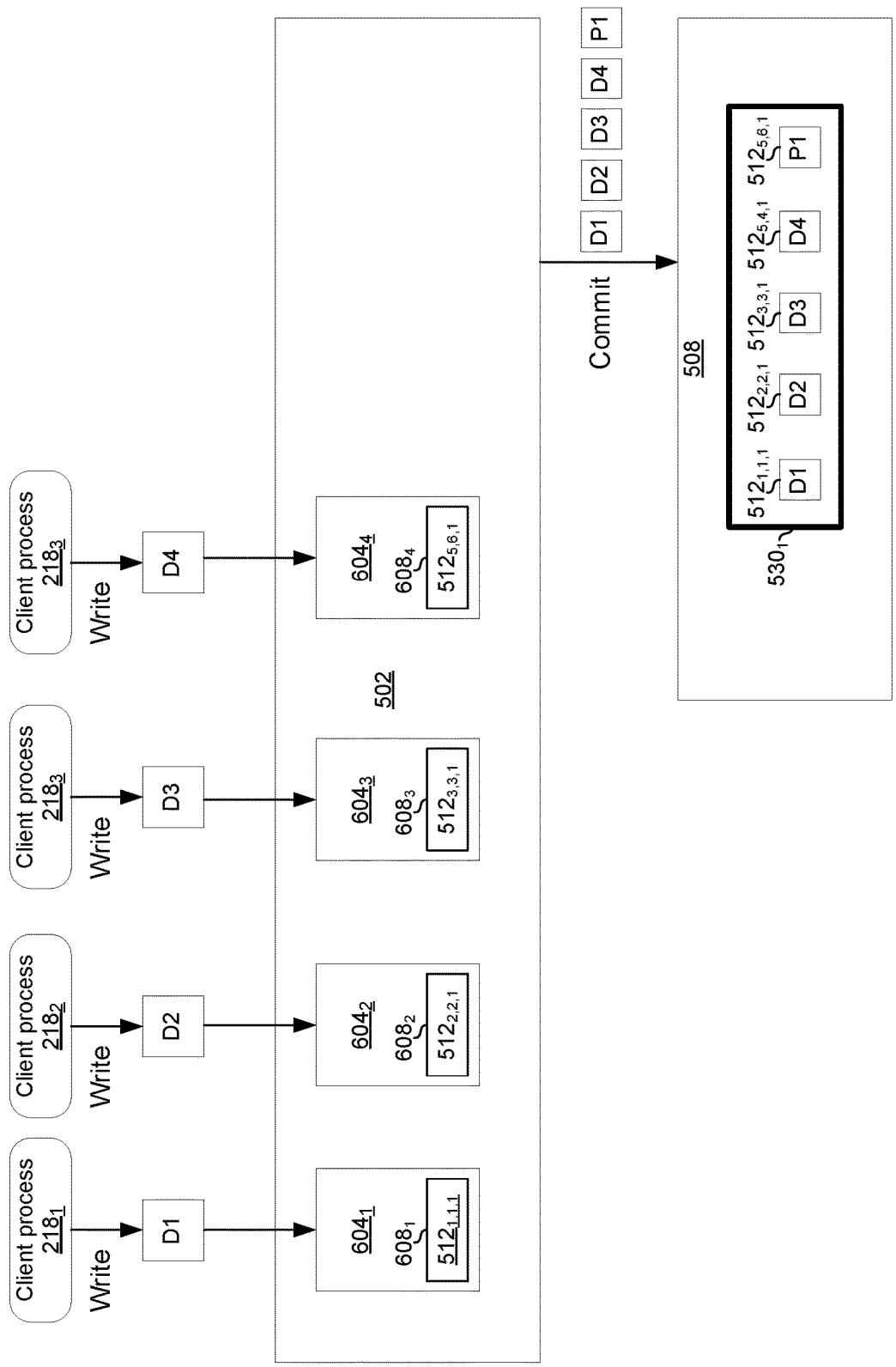
FIG. 6B illustrates coalescing of data for committing it to a single stripe

In FIG. 6B, each of the client processes $218_1$-$281_4$ issues a write to the virtual file system of a respective one of data portions D1-D4. Each of the client processes $218_1$-$281_4$ may be unaware of the others of the client processes $218_1$-$281_4$. Similarly, the data generated by each of them may be totally independent of the data generated by the others (i.e., D1 may be totally independent of each of D2, D3, and D4; D2 may be totally independent of D1, D3, and D4; and so on). Any two or more of the writes may happen concurrently, or all four writes may be spread out in time. In the example, D1 is a file (or portion of a file) which is associated with extent $604_1$, D2 is a file (or portion of a file) which is associated with extent $604_2$, D3 is a file (or portion of a file) which is associated with extent $604_3$, and D4 is a file (or portion of a file) which is associated with extent $604_4$. The data from the four writes is coalesced into a single commit which ends up in block stripe $530_1$. For purposes of illustration this example assumes M=4 and K=1 and that the block stripe 5301 is the same as shown in FIG. 5D. Thus, D1 is committed to block $512_{1,1,1}$ and a respective pointer $608_1$ of extent $604_1$ is updated to point to $512_{1,1,1}$, D2 is committed to block $512_{2,2,1}$ and a respective pointer $608_2$ of extent $604_2$ is updated to point to block $512_{2,2,1}$, D3 is committed to block $512_{3,3,1}$ and a respective pointer $608_3$ of extent $604_3$ is updated to point to block $512_{3,3,1}$, D4 is committed to block $512_{5,4,1}$ and a respective pointer $608_3$ of extent $604_3$ is updated to point to $512_{5,4,1}$, and P1 (e.g., equal to D1⊕D2⊕D3⊕D4) is committed to block $512_{5,6,1}$.

Figure 7:
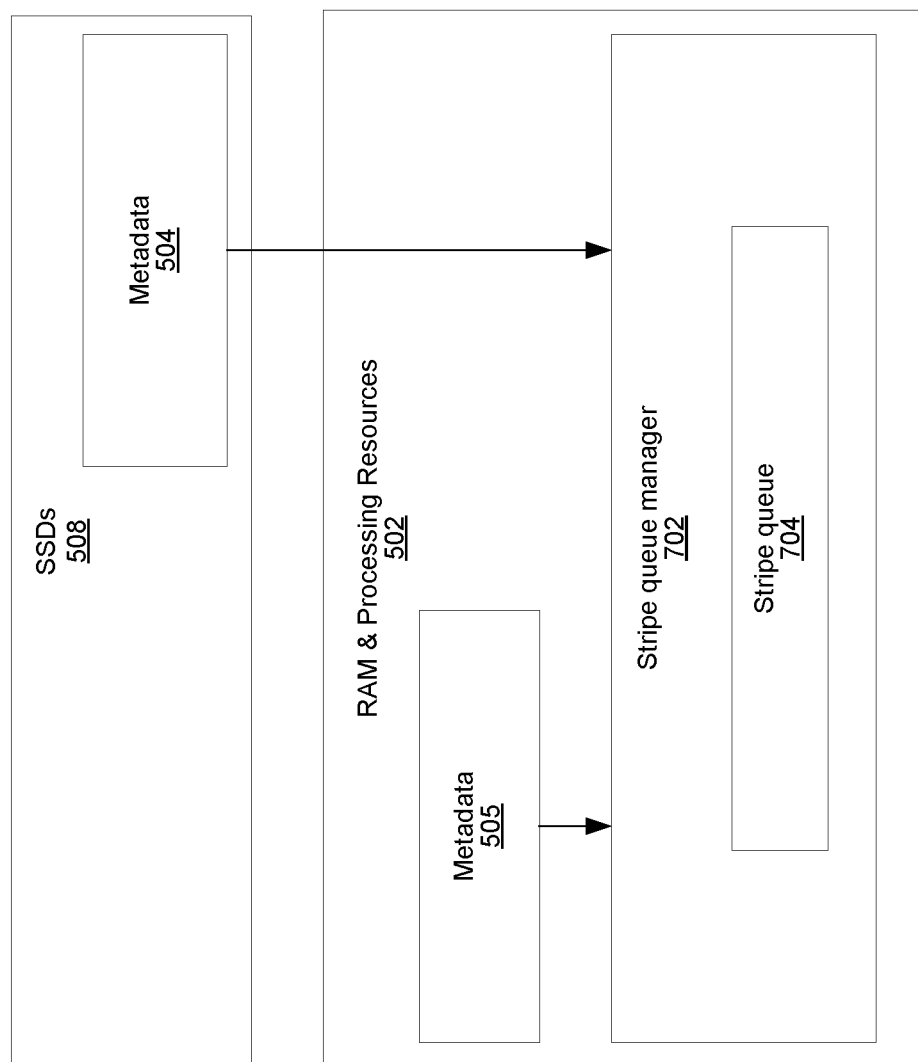
FIG. 7 illustrates components of a virtual file system for managing commits to storage.

Now referring to FIG. 7, shown again are the storage 508 and the memory and processing resources 502 shown in FIG. 5A. Additionally shown is a stripe queue 704 and a stripe queue manager 702. The stripe queue 704 stores a list of elements (e.g., pointers) corresponding to chunk stripes 520 and/or block stripes 530 of one or more DFRASs on the storage 508. The elements in the stripe queue 704 may be ranked (e.g., by sorting the queue and/or storing ranking metadata for the queue) based on characteristics of the chunk stripes 520 and/or block stripes 530 such that element(s) corresponding to the "most-attractive" chunk stripe(s) and/or block stripe(s) 530 are readily available (e.g., by simply "popping" the next element from the stripe queue 704). The characteristics may be determined from metadata 504 and/or metadata 505. A "most-attractive" chunk stripe 520 may, for example, correspond to the chunk stripe $520_s$ having the most (or at least a threshold number of) blocks 512 in a particular state, to the chunk stripe $520_s$ having the most (or at least a threshold number of) block stripes 530 with at least a certain number of blocks 512 in a particular state, to the chunk stripe $520_s$ to which the fewest (or at least below a threshold number of) commits have been performed, and/or the like. A "most-attractive" block stripe $530_b$ may, for example, correspond to the block stripe $530_b$ having the most (or at least a threshold number of) blocks 512 in a particular state, to the block stripe $530_b$ to which the fewest (or at least below a threshold number of) commits have been performed, and/or the like. The state of any particular block $512_{d,c,b}$ may be determined by characteristics such as: whether the block $512_{d,c,b}$ is currently storing data, whether data currently stored in the block $512_{d,c,b}$ is currently protected (i.e., was included in the calculation of the corresponding protection digits), whether data currently stored in the block $512_{d,c,b}$ is also stored elsewhere (e.g., in an object store), and/or the like.

In an example implementation, a separate stripe queue 704 may be maintained for each chunk stripe of a particular DFRAS such that any particular stripe queue 704 only has to keep track of a relatively small portion of all block stripes of a particular DFRAS. In such an implementation, the block stripes of the current chunk stripe may be ranked and used for commits until the current chunk stripe no longer meets some criterion (or criteria). The criterion (or criteria) may, for example, be based on the states of the various blocks and/or block stripes of the chunk stripe. For example, the criteria may be whether the chunk stripe comprises at least a threshold number of suitable block stripes, where a suitable stripe may be one which has at least a determined threshold number of blocks currently in a particular state (e.g., at least a threshold number of unprotected blocks and/or a least a threshold number of blocks available to be written with new data (for the first time, or overwritten)). Once the current chunk stripe no longer meets the criterion (or criteria), the node that owns the DFRAS may move to the next chunk stripe (e.g., randomly selected or selected based on a ranking of chunk stripes of the DFRAS). In this manner, the average cost of commit operations (as discussed further below with reference to FIGS. 9A and 9B) may be kept low. In the event that no chunk stripes of the DFRAS contain a sufficient number of suitable block stripes, a scrub of the DFRAS may be performed to convert unsuitable block stripes to suitable block stripes.

In an example implementation, the stripe queue 704 may also indicate a state of each block stripe $530_b$ corresponding to the elements in the queue 704. In an example implementation, the state of a block stripe 530 may be "prepared" or "unprepared." An unprepared block stripe $530_b$ is one which requires some operations to be performed on it before it is ready to accept a commit of data that has not previously been written to it. A prepared block stripe $530_b$ is one which has had such operations performed on it and is ready to accept a commit of data that has not previously been written to it. One example of such operations are described with reference to FIG. 8A, to which attention is now directed.

In block 802, the stripe queue manager 702 pops the next most-attractive unprepared block stripe(s) 530 ("first stripe(s)") from the stripe queue 704. In block 804, the virtual file system reads, from the first stripe(s), those blocks 512 of the first stripe(s) that are currently holding data ("first data") which is to be kept and protected during and after the next commit to the first stripe(s). In block 806, the virtual file system calculates protection digits ("first protection digits") for the first data. In block 808, the virtual file system commits the first protection digits to the first stripe(s). Upon completion of block 808, the first stripe(s) is/are prepared to accept new data. The queue manager 702 may then move on to preparing the next most-attractive unprepared block stripe(s) 530. The queue manager 702 may perform such queue preparation operations as a background process taking advantage of excess resources (processor cycles, available network bandwidth etc.) so as not to block other operations.

Figure 8A:
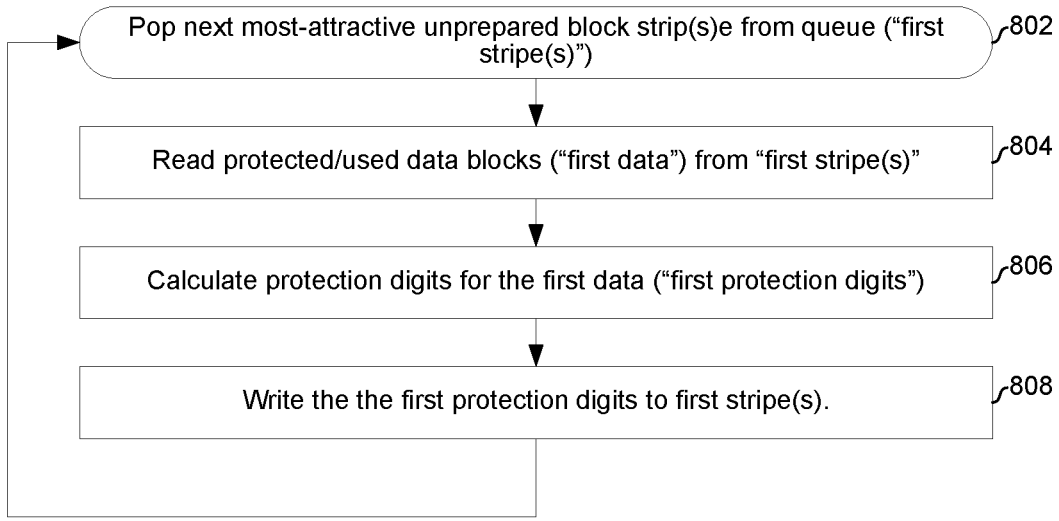
FIG. 8A is flowcharts illustrating an example process for preparing a block stripe for committing.
Figure 8B:
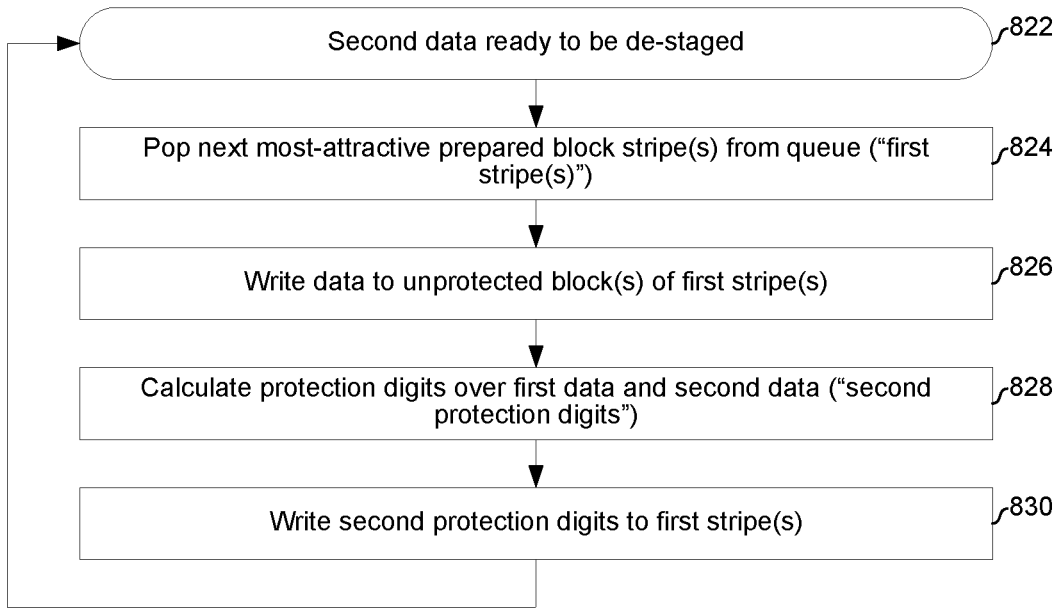
FIG. 8B is flowcharts illustrating an example process for committing data to a prepared block stripe.

FIG. 8B is a flowchart illustrating an example process for committing data to a block stripe prepared in FIG. 8A. In block 822, data ("second data") is ready to be de-staged to storage 508. In block 824, the stripe queue manager 702 pops the next most-attractive prepared block stripe(s) 530 ("first stripe(s)") from the stripe queue 704. In block 826, the second data is written to blocks of the first stripe(s) which are not storing data that is to be persisted through the commit operation. In block 828, the virtual file system calculates protection digits ("second protection digits") for the first stripe(s) based on the second data and the other data in the first stripe(s) that is to be persisted and protected through the commit of the second data. In block 830, the first protection digits of the first stripe(s) are overwritten with the second protection digits.

The processes of FIGS. 8A and 8B enable the commit operation performed in FIG. 8B to be very efficient. This is further described below with reference to FIGS. 12A and 12B.

Figure 9:
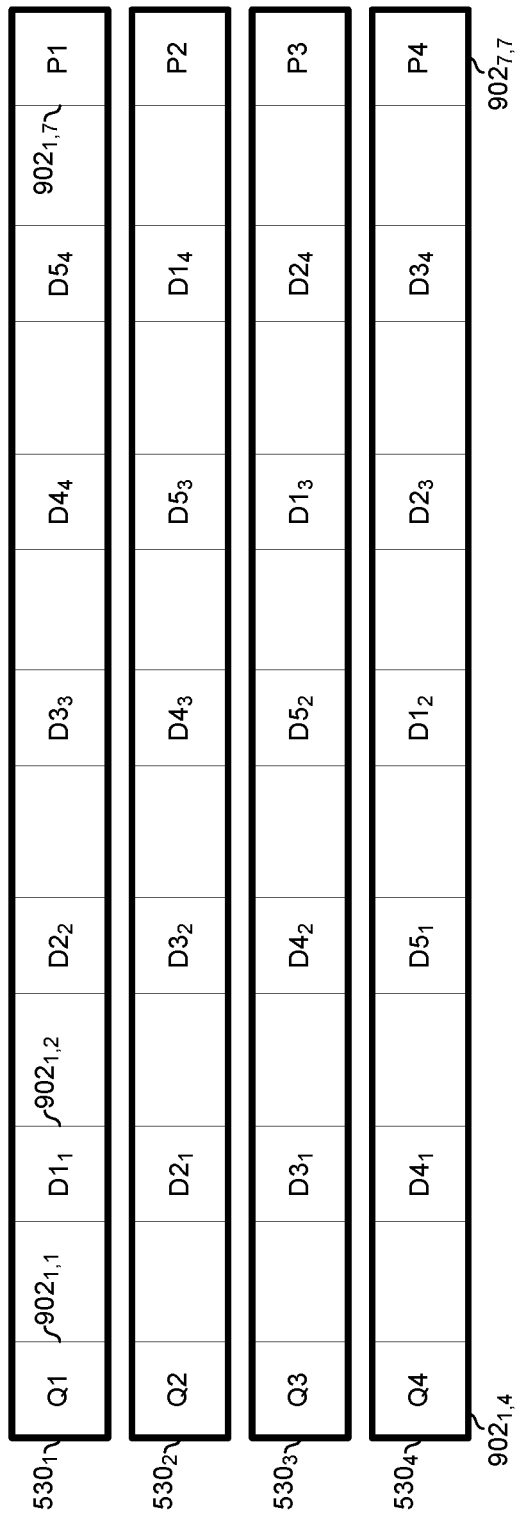
FIG. 9 illustrates a forward error correction scheme which may be used for protecting data stored to nonvolatile memory of a virtual file system in accordance with an example implementation of this disclosure.

FIG. 9 illustrates a forward error correction scheme which may be used for protecting data stored to nonvolatile memory of a virtual file system in accordance with an example implementation of this disclosure. Shown are storage blocks $902_{1,1}$-$902_{7,7}$ (each of which may be a block 512 described above) of block stripes $530_1$-$530_4$ of a DFRAS. In the protection scheme of FIG. 9, five blocks of each stripe are for storage of data digits and two blocks of each stripe are for data storage of protection digits (i.e., M=5 and K=2). In FIG. 9, the protection digits are calculated using the following equations (1)-(9):

$$P1 = D1_1 \oplus D2_2 \oplus D3_3 \oplus D4_4 \oplus D5_4 \quad (1)$$

$$P2 = D2_1 \oplus D3_2 \oplus D4_3 \oplus D5_3 \oplus D1_4 \quad (2)$$

$$P3 = D3_1 \oplus D4_2 \oplus D5_2 \oplus D1_3 \oplus D2_4 \quad (3)$$

$$P4 = D4_1 \oplus D5_1 \oplus D1_2 \oplus D2_3 \oplus D3_4 \quad (4)$$

$$Z = D5_1 \oplus D5_2 \oplus D5_3 \oplus D5_4 \quad (5)$$

$$Q1 = D1_1 \oplus D1_2 \oplus D1_3 \oplus D1_4 \oplus Z \quad (6)$$

$$Q2 = D2_1 \oplus D2_2 \oplus D2_3 \oplus D2_4 \oplus Z \quad (7)$$

$$Q3 = D3_1 \oplus D3_2 \oplus D3_3 \oplus D3_4 \oplus Z \quad (8)$$

$$Q4 = D4_1 \oplus D4_2 \oplus D4_3 \oplus D4_4 \oplus Z \quad (9)$$

Thus, the four stripes $530_1$-$530_4$ in FIG. 9 are part of a multi-stripe (four stripes, in this case) FEC protection domain and loss of any two or fewer blocks in any of the block stripes $530_1$-$530_4$ can be recovered from using various combinations of the above equations (1)-(9). For comparison, an example of a single-stripe protection domain would be if $D1_1$, $D2_2$, $D3_3$, $D4_4$, $D5_4$ were protected only by P1 and $D1_1$, $D2_2$, $D3_3$, $D4_4$, $D5_4$, and P1 were all written to stripe $530_1$ ($530_1$ would be the single-stripe FEC protection domain).

Figure 10:
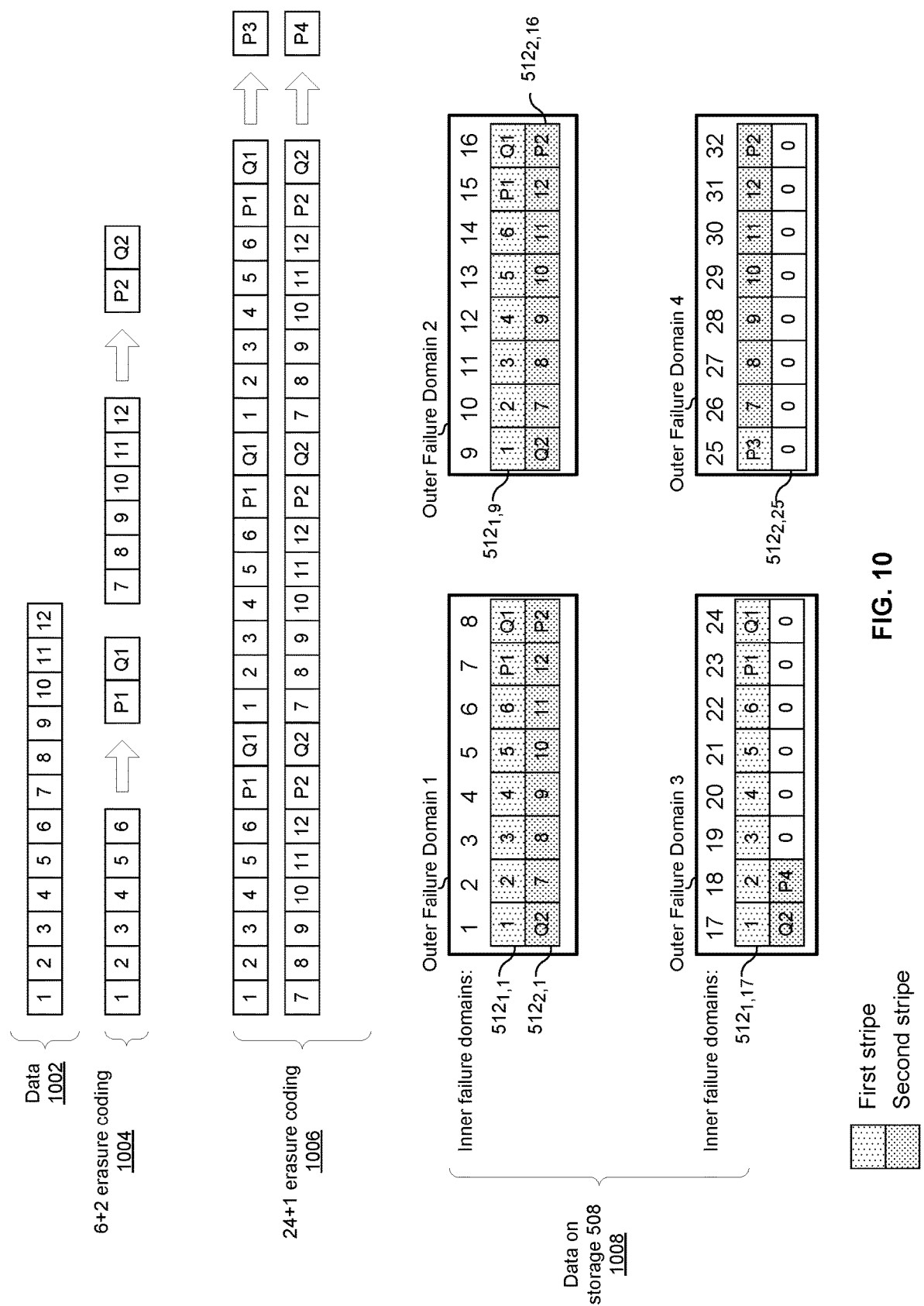
FIG. 10 illustrates a forward error correction scheme which may be used for protecting data stored to nonvolatile memory of a virtual file system in accordance with an example implementation of this disclosure.

FIG. 10 illustrates a forward error correction scheme which may be used for protecting data stored to nonvolatile memory of a virtual file system in accordance with an example implementation of this disclosure. FIG. 10 illustrates a scheme in which the protection may be described as ((M+K)×R)+O, where M is the number of data blocks in a block stripe, K is the number of protection blocks in a block stripe, R is a redundancy factor, and O is a number of protection blocks for which the protection digits are calculated over the (M+K)×R data blocks. In FIG. 10 M=6, K=2, R=3, and O=1. These numbers were chosen arbitrarily and are not intended as limiting.

Shown is data 1002 which is data to be stored in one or more block stripes upon completion of a commit. The data 1002 consists of 12 portions each of which may correspond to data already written to the block stripe(s) to which the data 1002 is to be committed and/or new data. Called out as 1004 is the calculation of P1 and Q1 based on data portions 1-6, and the calculation of P2 and Q2 based on data portions 7-12. Called out as 1006 is the calculation of P3 over three instances of data portions 1-6 and P1 and Q1, and the calculation of P4 over three instances of data portions 7-12 and P2 and Q2.

Called out as 1008 is one example of the data and protection written to two stripes on the storage 508. The first stripe spans blocks $512_{1,1}$ through $512_{1,25}$ (and thus inner failure domains 1 through 25) and the second stripe spans blocks $512_{1,26}$ through $512_{2,18}$ (and thus inner failure domains 26 through 18). In this example, storage 508 consists of 32 inner failure domains and four outer failure domains. For example, each inner failure domain may be a respective one of 32 SSDs and each outer failure domain may be a server housing a respective 8 of the 32 SSDs. Thus, if any single server fails it takes down its 8 SSDs with it. As shown, the protection scheme of FIG. 10 enables recovery in the event of a failure of an outer failure domain. In an example implementation, the protection scheme of FIG. 10 may be used in combination with a multi-stripe FEC protection domain such as is used in the example protection scheme of FIG. 9.

Figure 11:
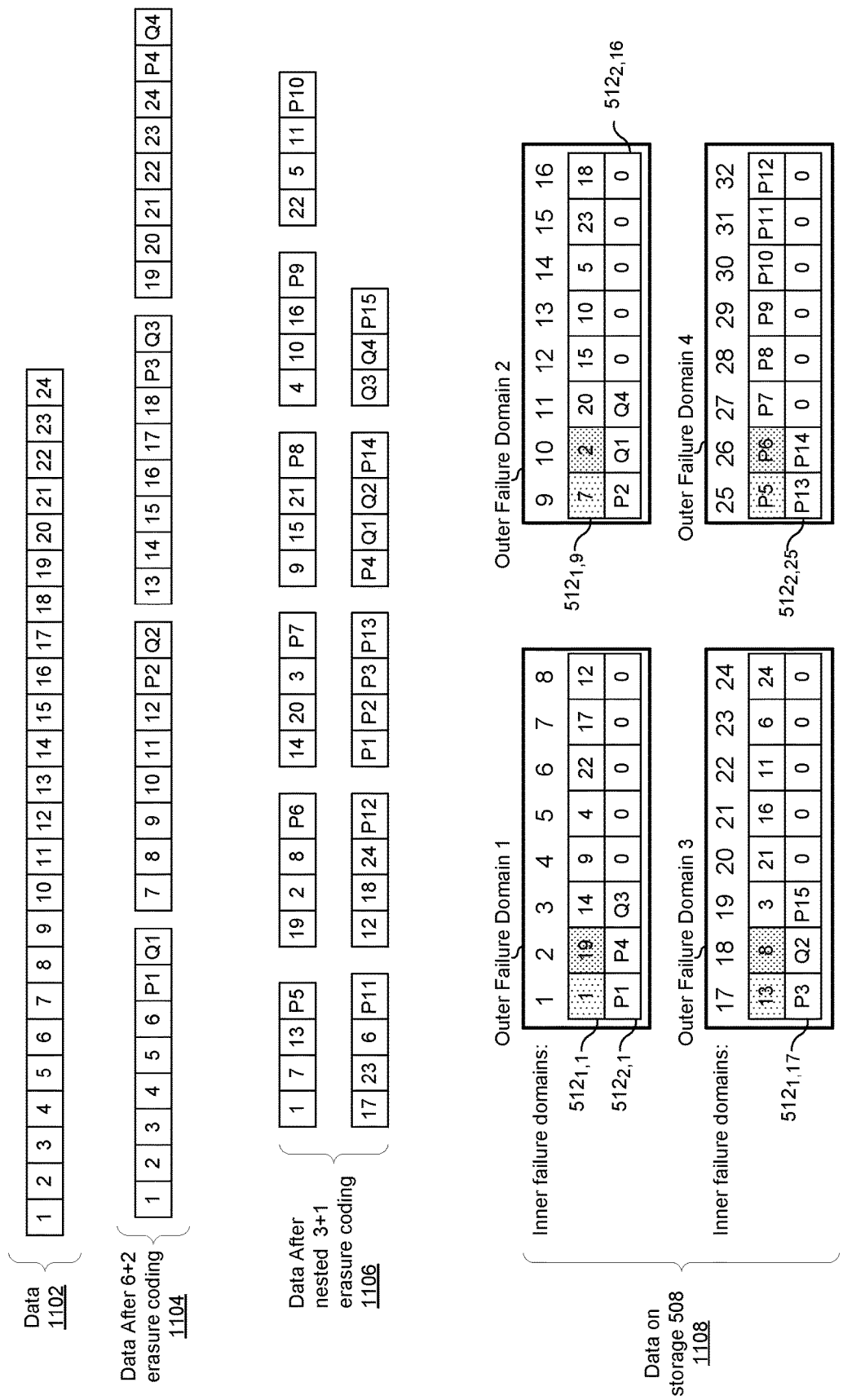
FIG. 11 illustrates a forward error correction scheme which may be used for protecting data stored to nonvolatile memory of a virtual file system in accordance with an example implementation of this disclosure.

FIG. 11 illustrates a forward error correction scheme which may be used for protecting data stored to nonvolatile memory of a virtual file system in accordance with an example implementation of this disclosure. The protection scheme of FIG. 11 may be described as a "nested" or "layered" protection scheme in which data is first encoded using $M_1+K_1$ and the resulting encoded data is again encoded using $M_2+K_2$ protection. Although only two layers of encoding used for illustration, such is not intended as limiting.

In FIG. 11, $M_1=6$, $K_1=2$, $M_2=3$, $K_2=1$. These numbers were chosen arbitrarily and are not intended as limiting.

Shown is data 1102 which is data to be stored in one or more block stripes upon completion of a commit. The data 1102 consists of 24 portions each of which may correspond to data already written to the block stripe(s) to which the data 1102 is to be committed and/or new data. Called out as 1104 is the calculation of P1 and Q1 based on data portions 1-6, P2 and Q2 based on data portions 7-12, P3 and Q3 based on data portions 13-18, P4 and Q4 based on data portions 19-24. Called out as 1106 is the calculation of P5 over data portions 1, 7, and 13; P6 over data portions 19, 2, and 8; P7 over data portions 14, 20, and 3; P8 over data portions 9, 15, and 21; P9 over data portions 4, 10, and 16; P10 over data portions 22, 5, and 11; P11 over data portions 17, 23 and 6; P12 over data portions 12, 18, and 24; P13 over P1, P2, and P3; P14 over P4, Q1, and Q2; and P15 over Q3 and Q4.

Called out as 1108 is one example of the data and protection written to eleven stripes on the storage 508 (of which the first two are called out in the figure). The first stripe spans inner failure domains 1, 9, 17, and 25; the second stripe spans inner failure domains 2, 10, 18, and 26, and so on. In this example, storage 508 consists of 32 inner failure domains and four outer failure domains. For example, each inner failure domain may be a respective one of 32 SSDs and each outer failure domain may be a server housing a respective 8 of the 32 SSDs. Thus, if any single server fails it takes down its 8 SSDs with it. As shown, the protection scheme of FIG. 10 enables recovery in the event of a failure of an outer failure domain. In an example implementation, the protection scheme of FIG. 11 may be used in combination with a multi-stripe FEC protection domain such as is used in the example protection scheme of FIG. 9.

Figure 12A:
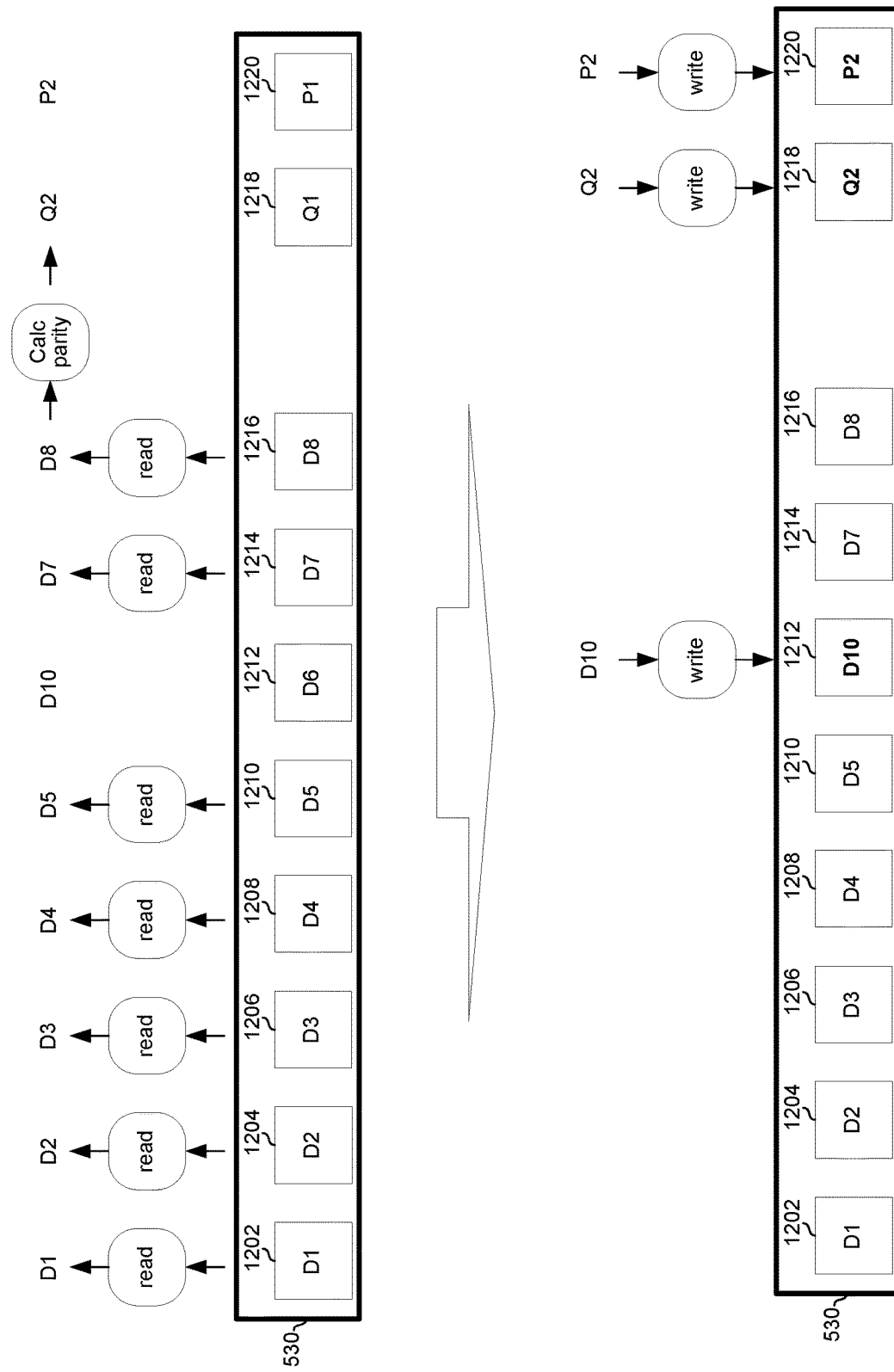
FIGS. 12A and 12B illustrate efficient commit operation which may be used by a virtual file system in accordance with an example implementation of this disclosure.
Figure 12B:
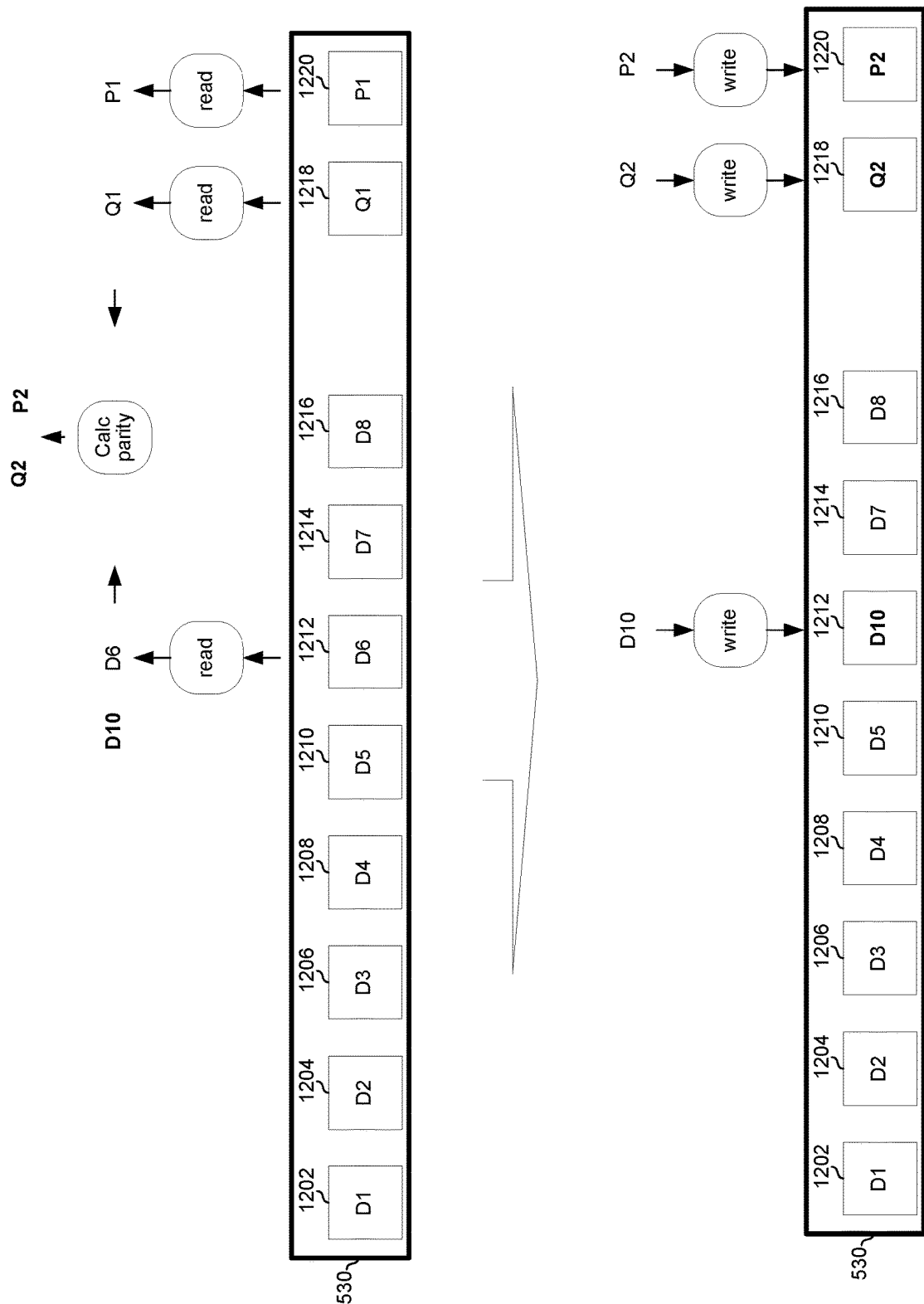

FIGS. 12A and 12B illustrate efficient commit operation which may be used by a virtual file system in accordance with an example implementation of this disclosure. Shown in FIGS. 12A and 12B are commits to an example stripe 530 comprising blocks 1202-1220 (each of which is an instance of a bock $512_{d,c,b}$) for which M=8 and K=2 and a single-stripe FEC protection domain is used.

FIG. 12A illustrates a first manner in which data may be written to the stripe 530. For this commit process, in order to commit 1 new block to the stripe 530, the other 7 blocks are read, new parity (Q2 and P2) is calculated based on the existing data (D1-D9) and the new data (D10), and then 3 writes are performed. Thus, committing 1 new block requires 7 read operations, a parity calculation, and 3 write operations. Generalizing to U new blocks to be written, the cost for committing U new blocks using this process may be described as: (M−U) reads+(U+K) writes+calculate parity.

FIG. 12B illustrates a second manner in which data may be written to the stripe 530. For this commit process, in order to commit 1 new block to the stripe 530, the following is performed: the 3 blocks are read—the parity blocks and the block to be overwritten (1212 in the example shown); new parity blocks (Q2 and P2) are calculated based on the data to be overwritten (D5), the new data (D10), and the old parity blocks (Q1 and P1); 3 blocks are written (new data D10 to 1212 and new parity Q2 and P2 to 1218 and 1220, respectively). Thus, committing 1 new block requires 3 read operations, a parity calculation, and 3 write operations. Generalizing to U new blocks to be written, the cost for committing U new blocks using this process may be described as: U+K reads+U+K+calculate parity.

For purposes of comparing the two processes, an example implementation may assume that the parity operations in FIGS. 12A and 12B are equally costly, and that reads and writes are equally costly. Under these assumptions, and denoting the cost of the parity calculation as 'Y', the cost of the process of FIG. 12A may be written as (M+K+Y)/U and the cost of the process of FIG. 12B may be written as (2×(U+K)+Y)/U. A threshold for deciding which of the two processes to use for any particular commit may be obtained by setting the costs equal: (M+K+Y)/U=(2×(U+K)+Y))/U. Solving for U results in (M−K)/2. Thus, when U is less than (M−K)/2, the process of FIG. 12B may have less overhead and when U is greater than (M−K)/2, the process of FIG. 12A may have less overhead.

Of course, in other implementations reads may not be equally costly as writes and/or the different parity calculations may not be equally costly. Such an implementation may take these factors into consideration when deciding which commit process to use for any particular commit operation. For example, a write may be G times more costly than a read, in which case the cost of the two processes can be rewritten as: (M−U)×G+(U+K)+calculate parity and (U+K)×G+(U+K)+calculate parity. From these expressions, a different criterion (e.g., threshold value of U) can be obtained to determine when to use the process of FIG. 12A and when to use the process of FIG. 12B. Similarly, different weighting factors could be applied to different parity calculations for arriving at a criterion for which commit process to use. Further, as the characteristics of NAND FLASH found in most SSDs result in writes being significantly more expensive than reads, and leveraging the ability to coalesce random writes on the same stripe (as discussed above with reference to FIGS. 6A and 6B), a virtual file system taking advantage of these aspects of this disclosure can achieve write overhead that is significantly better than a non-coalesced model, where the K protection blocks must be calculated and stored for a single write (i.e., for a non-coalesced model U may typically be 1, as in case of random workload). That is, aspects of this disclosure result in larger typical or average values of U as compared to a non-coalesced model.

As can be seen from the costs of both FIG. 12A (M+K+Y)/U) and FIG. 12B ((2×(U+K)+Y))/U), the cost/overhead of a commit operation goes down as the number of new blocks (U) to be written to the stripe goes up. Thus, in an example implementation, the stripe queue 704 (described above with respect to FIGS. 7, 8A, and 8B) may be managed so as to maximize some metric based on U (e.g., maximize U for any particular commit operation and/or maximize the average value of U over a series of commit operations). In an example implementation, this may be achieved by buffering data from multiple write instructions from one or more client applications and committing the data in a single commit to storage 308, as discussed above with reference to FIG. 6A.

In accordance with an example implementation of this disclosure, a plurality of computing devices (e.g., two or more of 104, 106, and 120) are communicatively coupled to each other via a network (e.g., 102), and each of the plurality of computing devices comprises one or more of a plurality of storage devices (e.g., 306). A plurality of failure resilient address spaces (e.g., a plurality of 514) are distributed across the plurality of storage devices such that each of the plurality of failure resilient address spaces spans a plurality of the storage devices. Each one of the plurality of failure resilient address spaces is organized into a plurality of stripes (e.g., a plurality of 530). Each one or more stripes of the plurality of stripes is part of a respective one of a plurality of forward error correction (FEC) protection domains (e.g., a multi-stripe FEC domain such as in FIG. 9). Each of the plurality of stripes may comprise a plurality of storage blocks (e.g., a plurality of 512). Each block of a particular one of the plurality of stripes may reside on a different one of the plurality of storage devices. A first portion the plurality of storage blocks (e.g., the quantity of five consisting of $902_{1,2}$-$902_{1,6}$ of stripe $530_1$ of FIG. 9) may be for storage of data digits, and a second portion of the plurality of storage blocks (e.g., the quantity of two $902_{1,1}$ and $902_{1,7}$ of stripe $530_1$ of FIG. 9) may be for storage of protection digits calculated based, at least in part, on the data digits. The plurality of computing devices may be operable to rank the plurality of stripes. The rank may be used for selection of which of the plurality of stripes to use for a next commit operation to the one of the plurality of failure resilient address spaces. The rank may be based on how many protected and/or unprotected storage blocks are in each of the plurality of stripes. For any particular one of the plurality of stripes, the rank may be based on a bitmap stored on the plurality of storage devices with the particular one of the plurality of stripes. The rank may be based on how many blocks currently storing data are in each of the plurality of stripes. The rank may be based on read and write overhead for committing to each of the plurality of stripes. Each of the failure resilient address spaces may be owned by only one of the plurality of computing devices at any given time, and each one of the plurality of failure resilient address spaces may be read and written only by its owner. Each of the computing devices may own multiple of the failure resilient address spaces. The plurality of storage devices may be organized into a plurality of failure domains. Each one of the plurality of stripes may span a plurality of the failure domains. Each of the failure resilient address spaces may span all of the plurality of failure domains, such that upon failure of any particular one of the plurality of failure domains, a workload for reconstructing the lost data is distributed among each of the others of the plurality of failure domains. The plurality of stripes may be distributed across the plurality of failure domains such that, in the event of concurrent failure of two of the plurality of failure domains, the chances of two blocks of any particular one of the plurality stripes residing on the failed two of the plurality of failure domains is exponentially less than the chances of only one block of any particular one of the plurality stripes residing on the failed two of the plurality of failure domains. The plurality of computing devices may be operable to first reconstruct any of the plurality of stripes which have two failed blocks, and then reconstruct any of the plurality of stripes which have only one failed block. The plurality of computing devices may be operable to perform the reconstruction of the plurality of stripes which have two failed blocks at a higher rate (e.g., with a greater percentage of CPU clock cycles dedicated to the reconstruction, a greater percentage of network transmit opportunities dedicated to the reconstruction, and/or the like) than the rate of reconstruction of the plurality of stripes which have only one failed block. The plurality of computing devices may be operable to determine, in the event of a failure of one or more of the failure domains, a rate at which any particular lost block is reconstructed based on how many other blocks of a same one of the plurality of stripes have been lost. Wherein one or more of the plurality of failure domains comprises a plurality of the storage devices. Each of the plurality of FEC protection domains may span multiple stripes of the plurality of stripes. The plurality of stripes may be organized into a plurality of groups (e.g., chunk stripes $520_1$-$520_S$), where each of the plurality of groups comprises one or more of the plurality of stripes, and, the plurality of computing devices are operable to rank, for each of the groups, the one or more of the plurality of stripes of the group. The plurality of computing devices may be operable to: perform successive committing operations to a selected one of the plurality of groups until the one or more of the plurality of stripes of the of the group no longer meets a determined criterion, and upon the selected one of the plurality of groups no longer meeting the determined criterion, select a different one of the plurality of groups. The criterion may be based on how many blocks are available for new data to be written to. Each one of the plurality of FEC correction domains (e.g., the first stripe in FIG. 10) may comprise a plurality of data storage blocks (e.g., $512_{1,1}$ through $512_{1,6}$, $512_{1,9}$-$512_{1,14}$, and $512_{1,17}$ through $512_{1,22}$), a first protection storage block (e.g., any one of $512_{1,7}$, $512_{1,8}$, $512_{1,15}$, $512_{1,16}$, $512_{1,23}$, and $512_{1,23}$), and a second protection storage block (e.g., $512_{1,25}$). Digits stored in the first protection storage block may be calculated based on contents of a subset of the plurality of data storage blocks. Digits stored in the second protection storage block may be calculated based on contents of at least a subset of the plurality of data storage blocks and the first protection block (e.g., P3 is calculated based on at least a subset of the contents of $512_1$ through $512_{24}$). The plurality of computing devices may be operable to calculate a first protection portion (e.g., P1 and Q1 of FIG. 10) based on a plurality of data portions (e.g., data portions 1 through 6 of FIG. 10), to replicate the plurality of data portions and the first protection portion, the replication resulting in a first set comprising the plurality of data portions, one or more replicas of the plurality of data portions, the first protection portion, and one or more replicas of the first protection portion (e.g., first set comprising three occurrences of data portions 1 through six and protection portions P1 and Q1, as shown at 1006 of FIG. 10), calculate a second protection portion based on all of the data portions and all of the first protection portions of the first set (e.g., calculate P3 based on all three occurrences of data portions 1 through six and protection portions P1 and Q1, as shown at 1006 of FIG. 10), commit the first set and the second protection portion to one of the plurality of FEC protection domains (e.g., to the first stripe in FIG. 10). One of the plurality of FEC protection domains (e.g., the first stripe in FIG. 11) may comprise a plurality of first storage blocks (e.g., $512_{1,1}$, $512_{1,9}$, and $512_{1,17}$) and a second storage block (e.g., $512_{1,25}$), wherein stored in each of the plurality of first storage blocks may be either: one of a plurality of data portions (e.g., one of data portions 1 through 24 of FIG. 11), or protection digits calculated based on the plurality of data portions (e.g., one of P1, Q1, P2, Q2, P3, Q3, P4, and Q4 in FIG. 11). Stored in the second storage block may be a protection portion calculated based on contents of the plurality of first storage blocks (e.g., one of P5 through P15 of FIG. 11). The system of claim 1, wherein the plurality of computing devices are operable to calculate a first protection portion (e.g., P1 of FIG. 11) based on a plurality of data portions (e.g., data portions 1 through 6 of FIG. 11), calculate a second protection portion based on a first subset of the first protection portion and the plurality of data portions (e.g., in FIG. 11, the calculation of P5 based on data portions 1, 7, and 13), commit the first subset of the first protection portion and the plurality of data portions and the first protection portion to a first one of the plurality of FEC protection domains (e.g., commit data portions 1, 7, 3, and P5 to the first stripe in FIG. 11), calculate a second protection portion based on a second subset of the first protection portion and the plurality of data portions (e.g., in FIG. 11, the calculation of P13 based on P1, P2, and P3), and commit the second subset of the first protection portion and the plurality of data portions and the second protection portion to a second one of the plurality of FEC protection domains (e.g., commit P1, P2, P3, and P13 to the ninth stripe in FIG. 11).

Thus, the present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable medium (e.g., FLASH drive(s), optical disk(s), magnetic storage disk(s), and/or the like) having stored thereon one or more lines of code executable by a computing device, thereby configuring the machine to be configured to implement one or more aspects of the virtual file system described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
a plurality of storage devices; and
a plurality of computing devices, wherein:
a failure resilient address space spans more than one storage device of the plurality of storage devices,
the plurality of computing devices is operable to maintain metadata that maps a plurality of memory blocks to the failure resilient address space,
the plurality of computing devices is operable to read data from the plurality of memory blocks,
a data read from a particular memory block of the plurality of memory blocks is checked for errors using a distributed erasure code based on blocks identified in an extent, and
a degraded data read is performed when the particular memory block of the plurality of memory blocks is found to be in error.

2. The system of claim 1, wherein the plurality of storage devices comprises non-volatile memory.

3. The system of claim 1, wherein the plurality of computing devices is operable to write data into the plurality of memory blocks.

4. The system of claim 3, wherein a buffer of data to be written to a first memory block of the plurality of memory blocks is compressed to provide space for a journal associated with the data written into the plurality of memory blocks.

5. The system of claim 3, wherein a buffer of data to be written to a memory block of the plurality of memory blocks is padded with data previously written into a portion of the memory block.

6. The system of claim 3, wherein the plurality of computing devices is operable to update an extent to identify one or more memory blocks of the plurality of memory blocks associated with protecting the data being written to the memory block.

7. The system of claim 1, wherein the degraded data read comprises regenerating the particular memory block from one or more memory blocks other than the particular memory block of the plurality of memory blocks.

8. A method for accessing storage media, the method comprising:
distributing a failure resilient address space, across a plurality of storage devices, via a plurality of computing devices;
maintaining metadata within the plurality of computing devices to map a plurality of memory blocks to the failure resilient address space;
reading data from the plurality of memory blocks;
checking data read from a particular memory block of the plurality of memory blocks for errors using a distributed erasure code based on blocks identified in an extent; and
performing a degraded data read when the particular memory block of the plurality of memory blocks is found to be in error.

9. The method of claim 8, wherein the plurality of storage devices comprises non-volatile memory.

10. The method of claim 8, wherein the method comprises writing data into the plurality of memory blocks.

11. The method of claim 10, wherein writing data comprises compressing a buffer of data to be written to a first memory block of the plurality of memory blocks to provide space for a journal associated with the data written into the plurality of memory blocks.

12. The method of claim 10, wherein writing data comprises padding a buffer of data to be written to a memory block of the plurality of memory blocks with data previously written into a portion of the memory block.

13. The method of claim 10, wherein the method comprises updating an extent to identify one or more memory blocks of the plurality of memory blocks associated with protecting the data being written to the memory block.

14. The method of claim 8, wherein performing a degraded data read comprises regenerating the particular memory block from one or more memory blocks other than the particular memory block of the plurality of memory blocks.

* * * * *